United States Patent
Feng et al.

(10) Patent No.: US 7,174,795 B2
(45) Date of Patent: Feb. 13, 2007

(54) INTEGRATED NON-CONTACTING TORQUE AND ABSOLUTE POSITION SENSOR FOR STEERING APPLICATIONS

(75) Inventors: Sainan Feng, Saginaw, MI (US); Mohammad Islam, Saginaw, MI (US); Matthew W. Mielke, Saginaw, MI (US); Christian Ross, Hemlock, MI (US); Tomy Sebastian, Saginaw, MI (US); Eric Pattok, Frankenmuth, MI (US); Ryan Pavlawk, Munger, MI (US); Samuel El-Nashef, Lansing, MI (US); Alan C. Davis, Fenton, MI (US); Harley D. Burkhard, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 21 days.

(21) Appl. No.: 11/036,806

(22) Filed: Jan. 14, 2005

(65) Prior Publication Data

US 2005/0172732 A1    Aug. 11, 2005

Related U.S. Application Data

(60) Provisional application No. 60/542,511, filed on Feb. 6, 2004.

(51) Int. Cl.
 *G01L 3/02* (2006.01)
(52) U.S. Cl. ............... 73/862.332; 73/862.331; 73/862.333; 73/862.334; 73/862.335
(58) Field of Classification Search ............... 73/862.331–862.335
See application file for complete search history.

(56) References Cited

U.S. PATENT DOCUMENTS

| | | |
|---|---|---|
| 4,899,596 A | 2/1990 | Janik et al. |
| 4,984,474 A | 1/1991 | Matsushima et al. |
| 5,789,917 A | 8/1998 | Oudet et al. |
| 5,837,908 A | 11/1998 | Ng et al. |
| 5,930,905 A | 8/1999 | Zabler et al. |
| 6,190,264 B1 | 2/2001 | Rawi |

(Continued)

FOREIGN PATENT DOCUMENTS

EP     1 083 406 A3     3/2001

(Continued)

*Primary Examiner*—Edward Lefkowitz
*Assistant Examiner*—Freddie Kirkland, III
(74) *Attorney, Agent, or Firm*—Michael D. Smith

(57) ABSTRACT

An integrated torque and position sensor is set forth for measuring the relative rotational movement between an input and an output shaft and for measuring the final angle position of the output shaft. The integrated sensor includes a wheel that rotates with the shaft. An incremental sensing mechanism detects the incremental rotation of the shaft. In response to the shaft rotating to a predetermined angle, an actuation mechanism engages the wheel with a change gear for every new revolution in which the shaft passes. A segment sensing mechanism detects the segment in which the shaft is disposed. A method is set forth to calibrate and compensate the electrical outputs generated by the integrated torque and position sensor. The method produces common amplitudes and establishes a common angle with an expected phase angle shift for the electrical outputs. The compensated electrical outputs are inserted into a solver equation and the values generated by the solver equation are inserted into an algorithm to calculate the final angle position of the shaft.

29 Claims, 19 Drawing Sheets

U.S. PATENT DOCUMENTS

| | | |
|---|---|---|
| 6,257,075 B1 | 7/2001 | Bachnak |
| 6,272,912 B1 | 8/2001 | Sano et al. |
| 6,341,426 B1 | 1/2002 | Okumura |
| 6,386,052 B1 | 5/2002 | Satoh et al. |
| 6,524,209 B2 | 2/2003 | Ito et al. |
| 6,552,533 B2 | 4/2003 | Schödlbauer et al. |
| 6,578,437 B1 | 6/2003 | Moerbe |
| 6,630,823 B2 | 10/2003 | Tateishi et al. |
| 6,655,493 B2 | 12/2003 | Menjak et al. |
| 6,658,747 B2 | 12/2003 | Kuru |
| 6,720,763 B1 | 4/2004 | Nehl et al. |
| 6,732,438 B2 | 5/2004 | Enzinna |
| 6,782,766 B2 | 8/2004 | Parkinson |
| 6,973,991 B2 * | 12/2005 | Tokumoto et al. .......... 180/446 |
| 6,978,685 B2 * | 12/2005 | Shiba et al. ........... 73/862.334 |
| 6,983,664 B2 * | 1/2006 | Tokumoto .............. 73/862.329 |
| 7,021,160 B2 * | 4/2006 | Pattok et al. .......... 73/862.332 |
| 7,021,161 B2 * | 4/2006 | Recio et al. ........... 73/862.333 |
| 7,028,545 B2 * | 4/2006 | Gandel et al. ................. 73/328 |
| 2001/0048301 A1 | 12/2001 | Schlabach et al. |
| 2002/0130657 A1 | 9/2002 | Li |
| 2003/0037622 A1 | 2/2003 | Laidlaw |
| 2003/0080734 A1 | 5/2003 | Hedayat et al. |
| 2003/0218458 A1 | 11/2003 | Seger et al. |
| 2004/0250631 A1 | 12/2004 | Pattok et al. |

FOREIGN PATENT DOCUMENTS

| | | |
|---|---|---|
| GB | 2 379 277 A | 3/2003 |
| WO | WO 96/01410 | 1/1996 |

\* cited by examiner

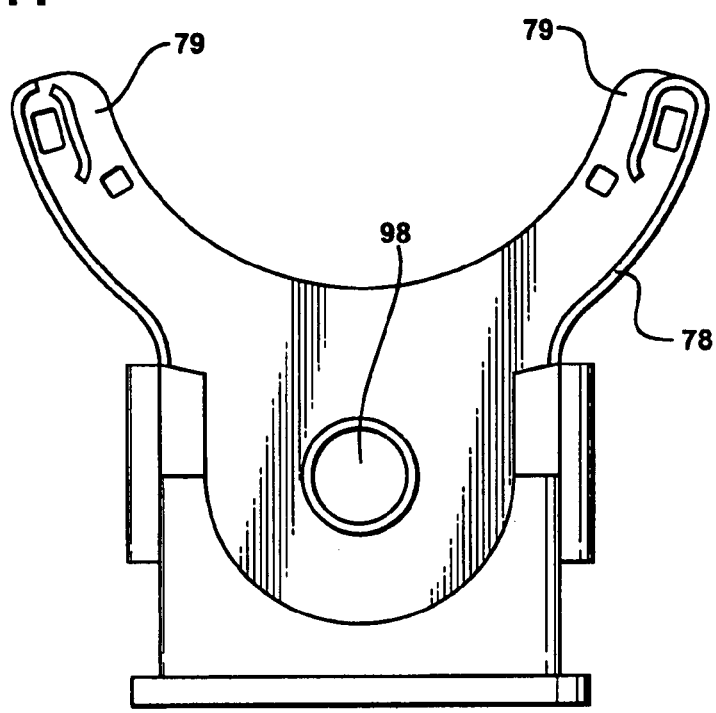
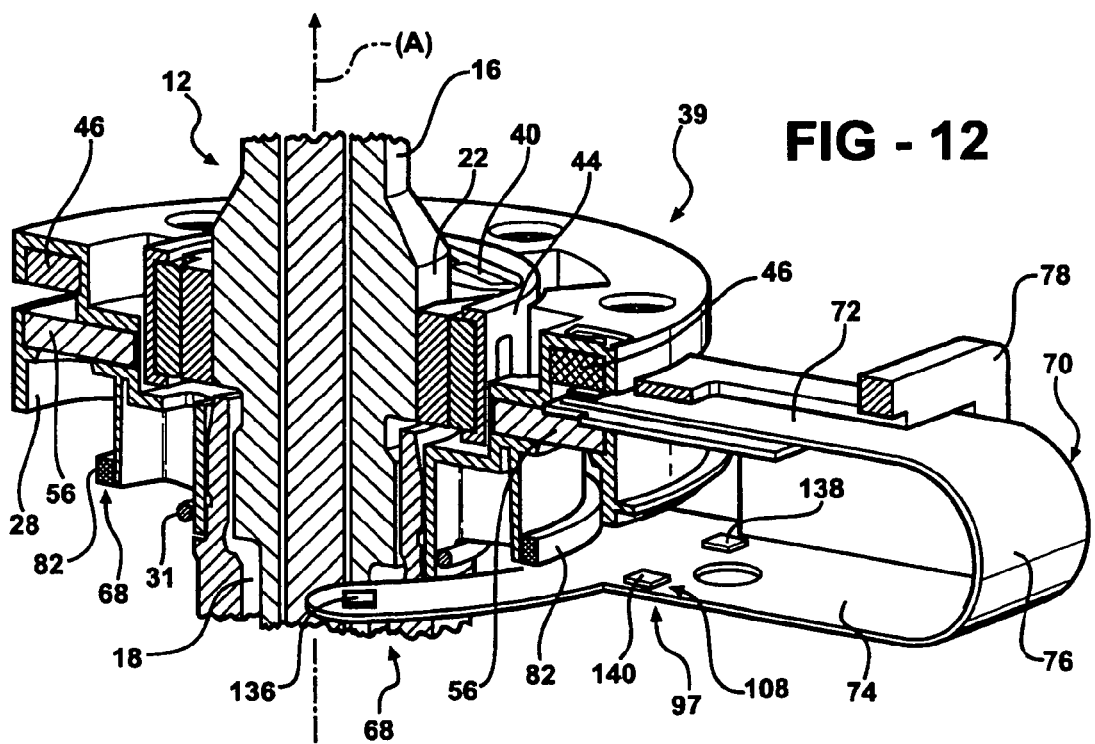

INTEGRATED NON-CONTACTING TORQUE AND ABSOLUTE POSITION SENSOR FOR STEERING APPLICATIONS

This application claims the benefit of the U.S. Provisional Patent Application Ser. No. 60/542,511, filed on Feb. 6, 2004, which is hereby incorporated by reference.

TECHNICAL FIELD

The present invention relates to an integrated torque and position sensor for detecting the relative rotational angular displacement between two rotatable shafts joined by a torsion bar and for detecting the angular position of a rotatable shaft. The present invention also provides a method of calibrating and calculating the angular position of shaft.

BACKGROUND OF THE INVENTION

The need to measure both the torque and the angular position of a steering shaft is important to automotive applications utilizing an electric power steering system (EPS). A number of standalone sensors have been developed related to either determining torque or calculating the angular position of a steering wheel. Generally, it is necessary to calculate the torque in order to determine the amount of electrical assist to apply when a driver turns a steering wheel. In determining torque, the driver typically turns the steering wheel which is connected to an input shaft. The input shaft is coupled to an output shaft which is connected to a steering mechanism. The input and output shafts are generally coupled together with a torsion bar and the torsion bar allows for relative rotation between the shafts. The input shaft may rotate with respect to the output shaft by a predetermined number of degrees, e.g. +/−12 degrees. An example of a torque sensor is disclosed in U.S. Patent Application Publication No. 2004/0250631 filed on Jul. 13, 2004 which is assigned to the assignee of the present invention and is hereby incorporated as a reference. An example of a position sensor is disclosed in U.S. Pat. No. 6,720,763 which is assigned to the assignee of the present invention and is hereby incorporated as a reference.

Position sensors are used for determining the angular position of the shaft as a user turns a steering wheel. Examples of position sensors are disclosed in U.S. Pat. No. 5,930,905 (the '905 patent) to Zabler et al., and in U.S. Pat. No. 6,630,823 (the '823 patent) to Tateishi et al. The '905 patent discloses a gear having a plurality of teeth coupled to a shaft. The teeth engage a plurality of additional teeth disposed on a second gear and a third gear. A pair of absolute sensors are positioned in proximity to the second gear and the third gear for generating an output that corresponds to the angular positions of the gears. As long as the number of teeth on each of the gears are known, it is possible to calculate the angular position of the shaft based on the outputs of the absolute sensors.

The '823 patent discloses a gear having a plurality of teeth coupled to a shaft. As the shaft rotates, the teeth on the gear engages with additional gear teeth disposed on a second gear. A bevel gear disposed on a different plane from the second gear engages a change gear. A first sensing element is positioned in proximity with the change gear for outputting a first detection signal which repeats continuously. A screw is positioned through the change gear and rotates with the change gear as the change gear rotates. A driven body is coupled with the screw and is axially displaced in response to rotating the change gear. A second sensing element is positioned in proximity to the driven body and outputs a second detection signal which gradually increases or decreases. A detection circuit determines the angular position of the shaft based on the first and the second detection circuits.

Although these prior art position sensors are useful, an opportunity exists for a position sensor that minimizes the number of gear teeth disposed on a gear while providing the angle position of the shaft with accuracy. By reducing the number of gear teeth on a gear, the sensor is not susceptible to losing accuracy as a result of the teeth wearing down over time. Additionally, an opportunity exists for combining the torque and position sensing capabilities into an integrated sensor to occupy less package space in a vehicle. Finally, by combining the functionality of a sensor which calculates both the torque and angular position of a shaft, common parts may be utilized within the sensor for providing additional cost savings.

SUMMARY OF THE INVENTION

It is the object of the present invention to provide an integrated torque and position sensor for measuring the relative rotation between an input and an output shaft and for measuring the angular position of the output shaft. The integrated torque and position sensor includes a support housing that supports the output shaft about an axis and an input shaft that is axially aligned with the output shaft for rotation about an axis. A torsion bar interconnects the input shaft and the output shaft for allowing relative rotation between the shafts in response to a torque being applied to the input shaft. A wheel is coupled to the output shaft for rotation therewith. A torque sensing mechanism is disposed about the shafts for measuring the relative rotation between the input and the output shaft. An incremental sensing mechanism generates an incremental output which is indicative of the angular position of the output shaft and a segment sensing mechanism provides a segment output indicative of the revolution in which the output shaft is disposed. A sensor casing is supported by the support housing and the sensor casing supports portions of the torque, incremental, and segment sensing mechanisms.

It is a further object of this invention to provide a sensor assembly for measuring the angular position of a shaft. A wheel is coupled with the shaft for incremental angular rotation and through a plurality of revolutions. An incremental sensing mechanism detects the rotation of the wheel and provides an incremental output which is indicative of the incremental angular rotation of the wheel. A change gear is supported by the sensor casing for rotation through predetermined angular segments. A segment sensing mechanism responds to the change gear for providing a segment output indicative of the angular segment in which the wheel is disposed. An actuation mechanism interconnects the wheel and the change gear for rotating the change gear through each of the predetermined angular segments for each occurrence of rotation of the wheel completely through a predetermined number of increments of angular rotation and to prevent rotation of the change gear during rotation of the wheel through each of the predetermined number of increments of rotation.

The subject invention also provides a method of calibrating a position sensor of a type that measures the incremental angular rotation of a shaft and the segment in which the shaft is disposed to produce the final angular position of shaft. The method includes the steps of rotating a shaft, generating a first incremental output having a first incremental amplitude and an incremental phase angle which is indicative of the incremental angular rotation of the shaft, generating a second incremental output having a second incremental amplitude and the incremental phase angle which is indicative of the incremental angular rotation the shaft, generating a first segment output having a first segment amplitude and a segment phase angle which is indicative of the angular segment in which the shaft is disposed, and generating a second segment output having a second segment amplitude and the segment phase angle phase which is indicative of the angular segment in which the shaft is disposed.

The method further includes performing a Fourier analysis on the incremental and segment outputs from the sensor to produce incremental and segment dc components, incremental and segment fundamental outputs and incremental and segment harmonic outputs. A compensation equation is used to provide a common amplitude between the first and the second incremental outputs. A first incremental final output corresponds to the compensated first incremental output and a second incremental final output corresponds to the compensated second incremental output wherein the compensated factors also correct the phase shift errors between the first and the second incremental outputs. Likewise, a compensation equation is used to provide a common amplitude between the first and the second segment outputs. A first segment final output corresponds to the compensated first segment output and a second segment final output corresponds to the compensated second segment output wherein the compensated factors also correct the phase shift errors between the first and the second incremental outputs.

Accordingly, the integrated torque and position sensor sets forth a reduction in the amount of teeth necessary to calculate the angle position which over time ensures greater accuracy in calculating the angle position of a shaft. At the same time, the integrated torque and position sensor utilizes common components for performing both functions of calculating the angle position and the torque of the shaft.

BRIEF DESCRIPTION OF THE DRAWINGS

Other advantages of the present invention will be readily appreciated as the same becomes better understood by reference to the following detailed description when considered in connection with the accompanying drawings wherein:

FIG. 11 is a top view of the sensor casing of FIG. 10;

FIG. 12 is a first cross sectional view of the integrated torque and position sensor without the change gear;

DESCRIPTION OF THE PREFERRED EMBODIMENT

Figure 1:
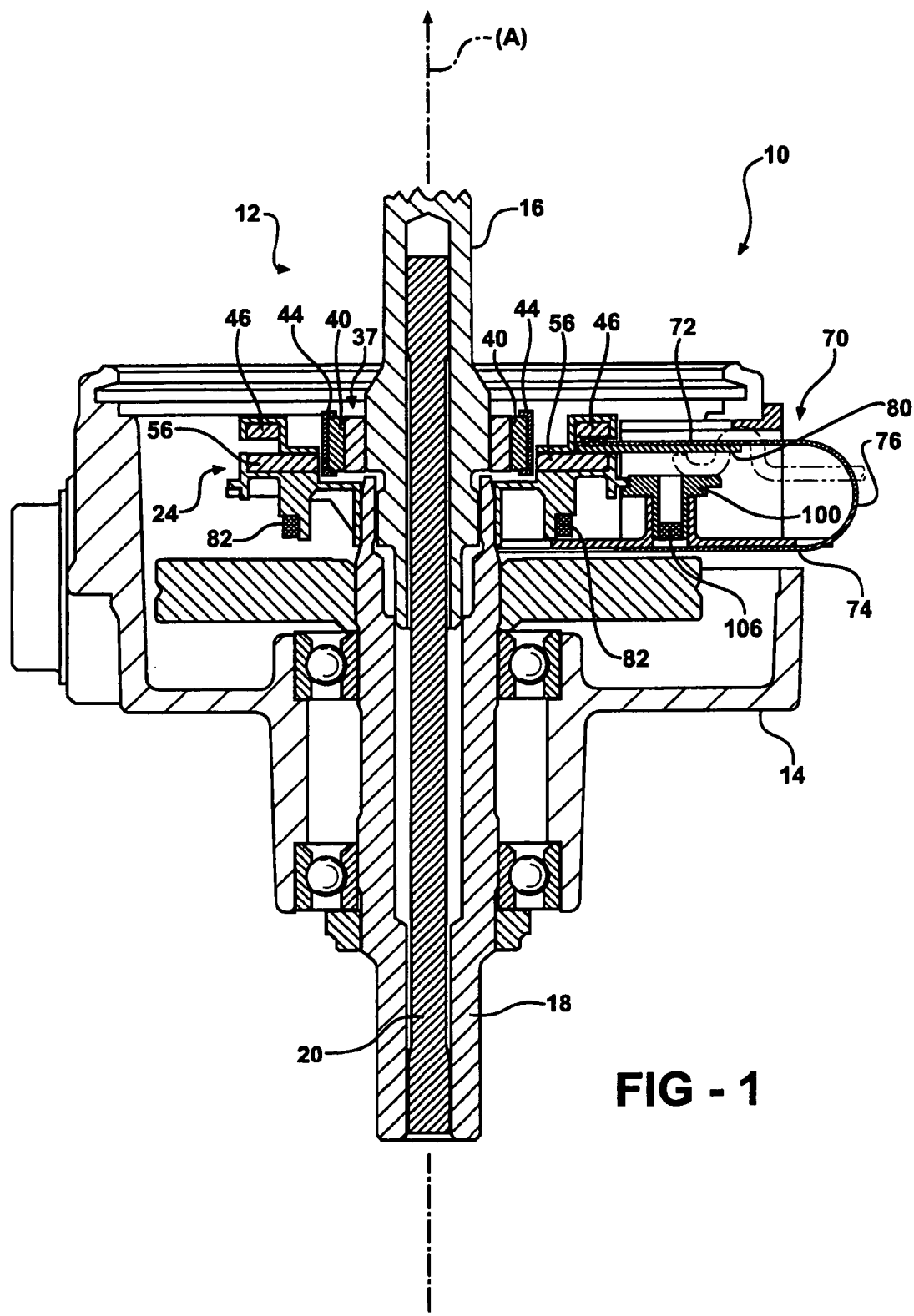
FIG. 1 is a cross sectional view of the integrated torque and position sensor which includes the support housing.
Figure 2:
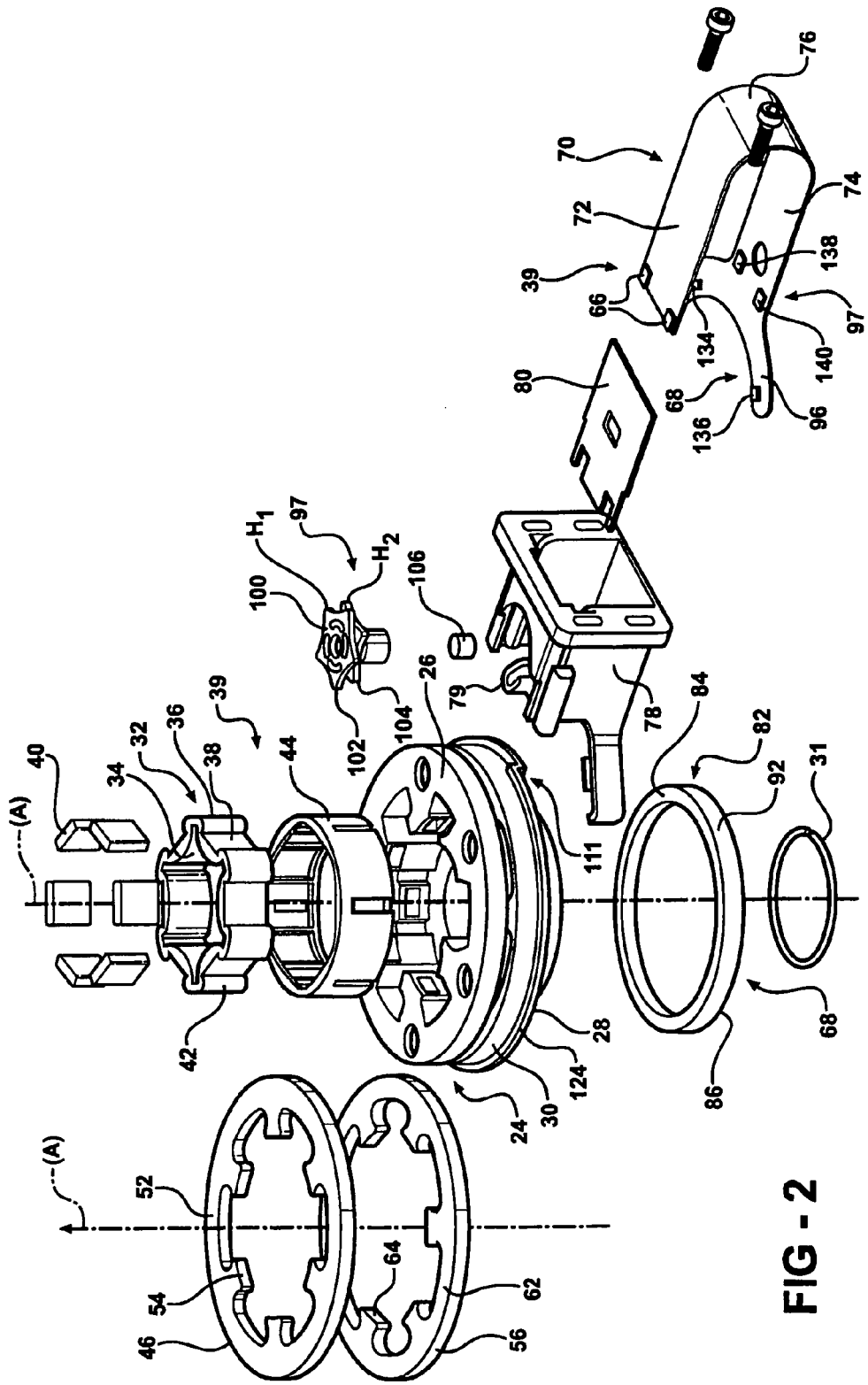
FIG. 2 is an exploded view of the integrated torque and position sensor.

Referring to the FIGS. 1–2, wherein like numerals indicate like parts throughout all of the figures, an integrated torque and position sensor (integrated sensor hereafter) is generally shown at 10 and provides the torque and the angular position of a shaft 12. A support housing 14 supports the integrated sensor 10 and the shaft 12. The shaft 12 includes an input shaft 16, an output shaft 18 and a torsion bar 20 positioned therebetween for allowing relative rotation between the input shaft 16 and the output shaft 18. The input shaft 16 is coupled to a steering wheel (not shown). The output shaft 18 is coupled to a steering system (not shown), for example, a rack and pinion gear mechanism.

Torque Sensing

Referring to FIGS. 1–2, the integrated sensor 10 utilizes a wheel 24 and a torque sensing mechanism 39 for measuring the relative rotation between the input shaft 16 and the output shaft 18. The wheel 24 includes a first side 26, a second side 28 and a middle portion 30 disposed therebetween. A coupling ring 31 is coupled to the wheel 24 for securing the wheel 24 to the output shaft 18.

The torque sensing mechanism further includes a torque rotor assembly 37 supported by said input shaft 16. The torque rotor assembly 37 includes a back iron 32 which is made of a soft magnetic material, such as a nickel iron alloy. The back iron 32 may be constructed by a stamping process or produced from a powdered metal using a sintering process or through a machining process.

Figure 3:
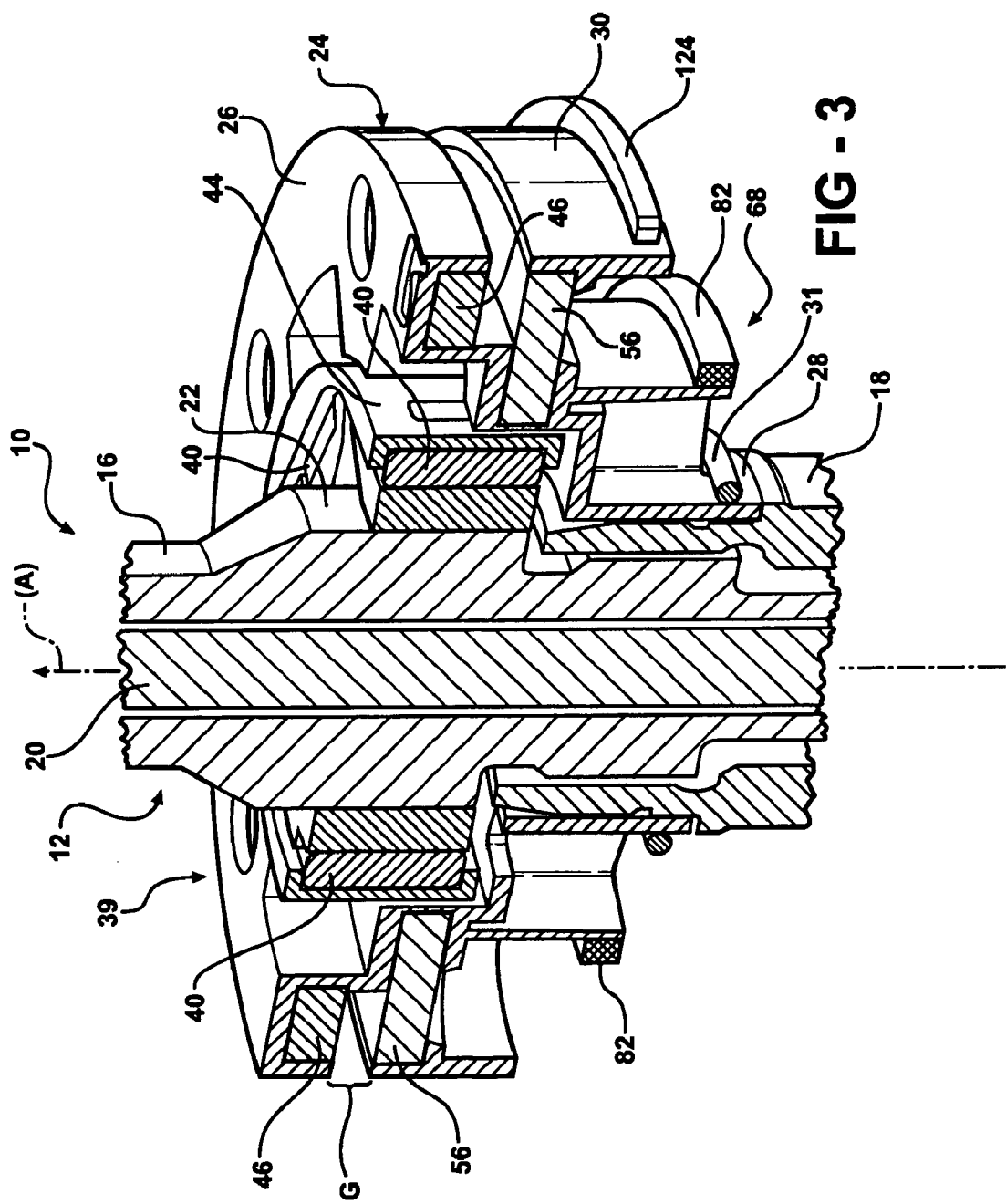
FIG. 3 is a second cross sectional view of the integrated torque and position sensor.
Figure 4:
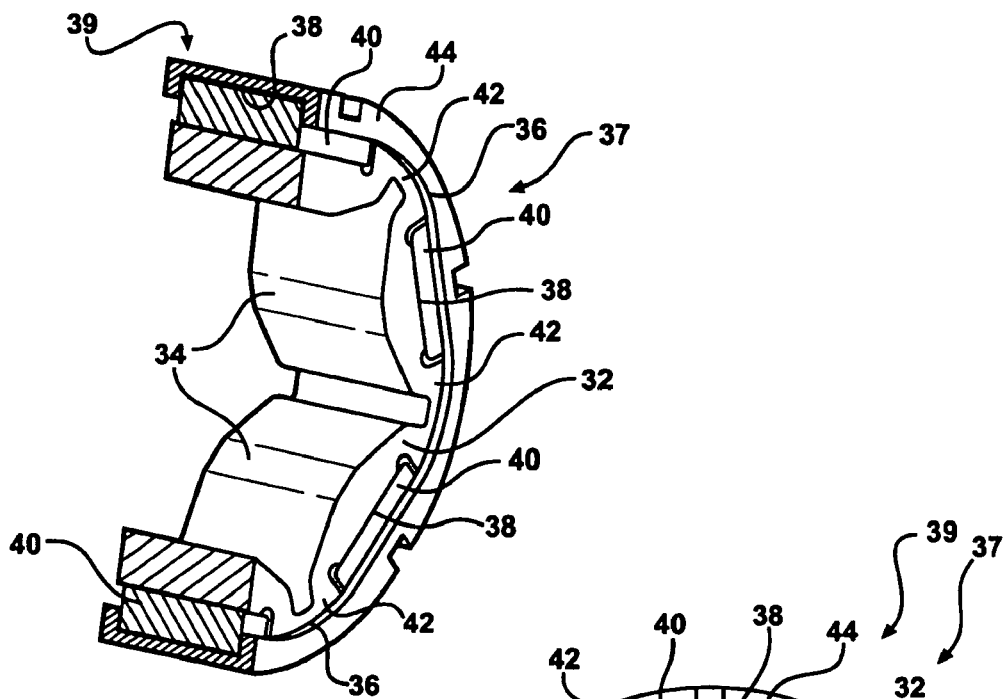
FIG. 4 is a cross sectional view of the torque rotor assembly.

Referring to FIGS. 2–4, the back iron 32 includes an inner surface 34 and an outer surface 36 and is centered on an axis (A). The input shaft 16 includes an enlarged portion 22 and the inner surface 34 of the back iron 32 is press fit over the enlarged portion 22 for non-rotatably coupling the back iron 32 to the input shaft 16. The output shaft 18 is coupled to the second side 28 of the wheel 24.

Figure 5:
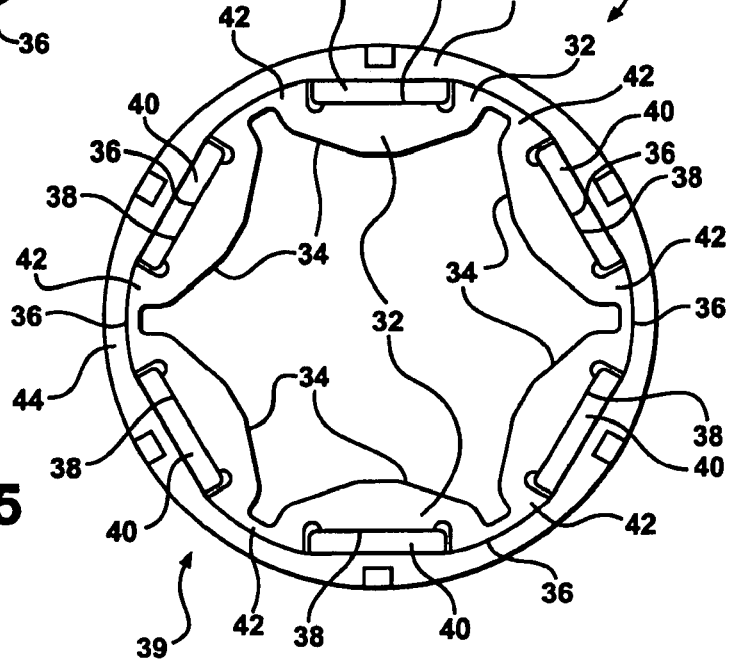
FIG. 5 is a top view of FIG. 4.

Referring to FIGS. 2 and 4–5, the back iron 32 defines a plurality of pockets 38 disposed on the outer surface 36. The torque rotor assembly 37 includes a plurality of magnets 40 disposed in the pockets 38. The magnets 40 may be permanently affixed within the pockets 38 by either crimping, injection molding or by adding an adhesive. The back iron 32 includes a plurality of support structures 42 integrally formed between the pockets 38 on the outer surface 36. The torque rotor assembly 37 includes a retaining ring 44 that is placed over the back iron 32 and is radially spaced from the pockets 38 for applying an inward force against the magnets 40. The retaining ring 44 may not be necessary if the magnets 40 are affixed to the pockets 38 by adhesive or other methods.

Referring to FIG. 5, an arrangement of six magnets 40 are disposed circumferentially in six pockets 38 on the outer surface 36 of the back iron 32. The north and south pole arrangements for the magnets 40 may take on any number of different embodiments. In one embodiment, the magnets 40 are magnetized with all north poles facing outwardly and south poles facing inwardly.

Figure 6:
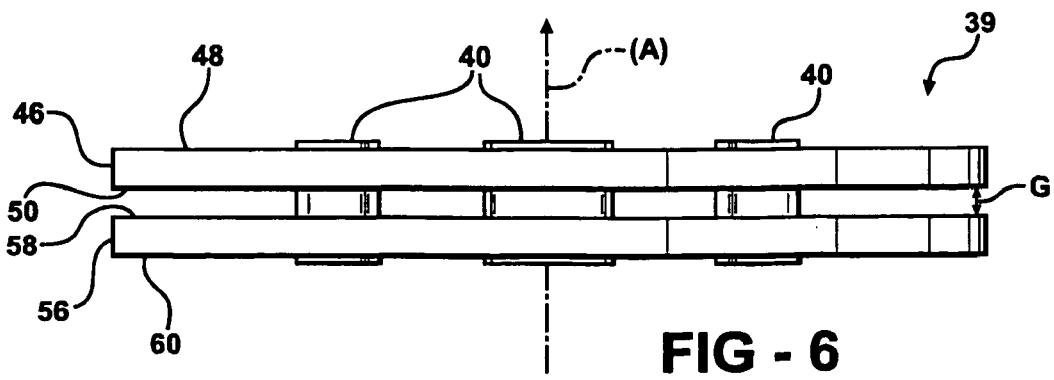
FIG. 6 is a side view of the pair of torque stators and the magnets.

Referring to FIGS. 2–3 and 6, the wheel 24 includes a first torque stator 46 and a second torque stator 56. The first torque stator 46 and the second torque stator 56 are centered on the axis (A) and are axially spaced and parallel to each other. The first torque stator 46 includes a first upper surface 48 and a first lower surface 50. Likewise, the second torque stator 56 includes a second upper surface 58 and a second lower surface 60. The first torque stator 46 and the second torque stator 56 are disposed within the integrated sensor 10 whereby the first lower surface 50 of the first torque stator 46 faces the second upper surface 58 of the second torque stator 56. The first torque stator 46 and the second torque stator 56 may be manufactured using a stamping process or may be made from a powdered metal using a sintering process or may be made using a machining process.

Figure 7:
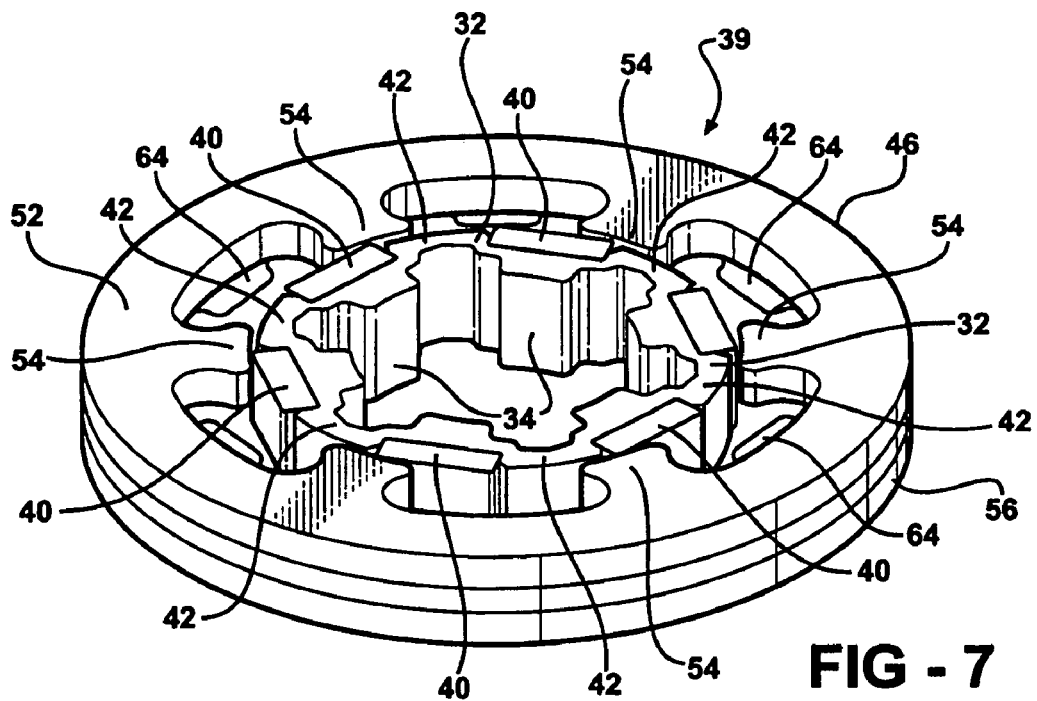
FIG. 7 is an elevated view of the pair of torque stators and the torque rotor assembly.
Figure 8:
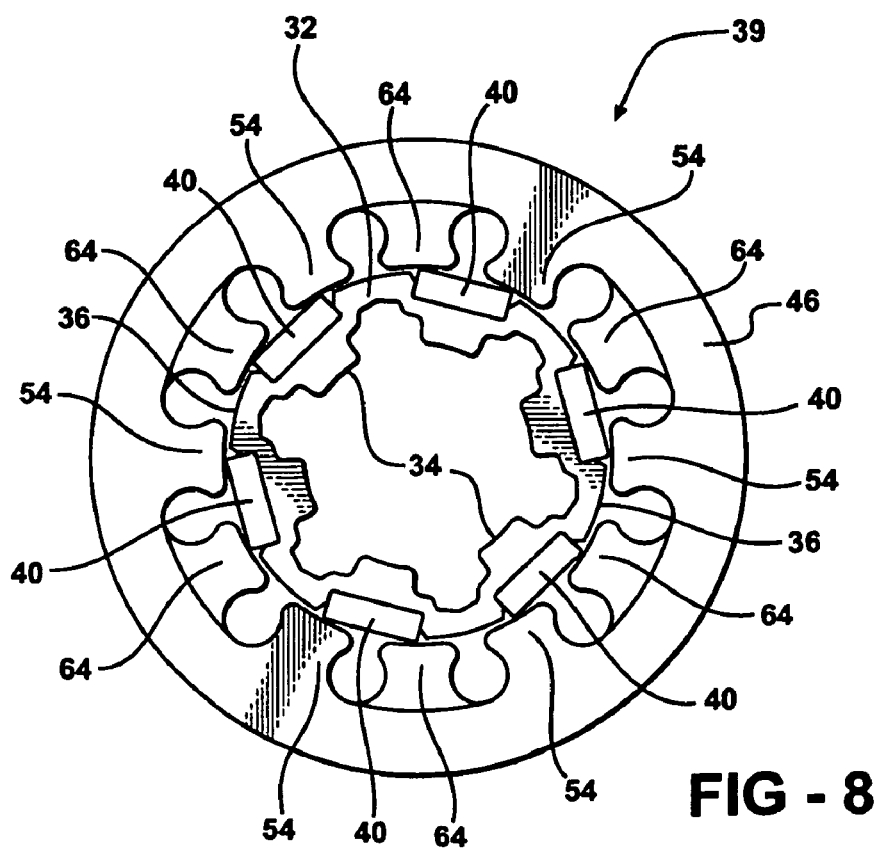
FIG. 8 is a top view of the pair of torque stators and the torque rotor assembly of FIG. 7.

Referring to FIGS. 2 and 7–8, the first torque stator 46 includes a circular base 52 and a plurality of teeth 54 extending inwardly from the circular base 52 in a radial direction. Additionally, the second torque stator 56 includes a circular base 62 and a plurality of teeth 64 extending inwardly from the circular base 62 in a radial direction. As shown in FIG. 8, the teeth 54, 64 of the first torque stator 46 and the second torque stator 56 are angularly offset or out of phase with each other. Alternative embodiments may include teeth 54, 64 from the first torque stator 46 and the second torque stator 56 as being angularly aligned or in phase with each other.

Referring to FIGS. 1 and 3, the wheel 24 is made of a non-magnetic material such as plastic and is over molded over the first torque stator 46 and the second torque stator 56. As stated above, the first torque stator 46 and the second torque stator 56 are disposed within the wheel 24 and the wheel 24 fixes the out of phase relationship between the extending teeth 54, 64 of the first torque stator 46 and the second torque stator 56 and the axial displacement between the first torque stator 46 and the second torque stator 56 after the over molding process is performed. The axial displacement between the first torque stator 46 and the second torque stator 56 defines a gap (G) for establishing a measurement zone through which the magnetic flux from the plurality of magnets 40 passes.

Figure 13:
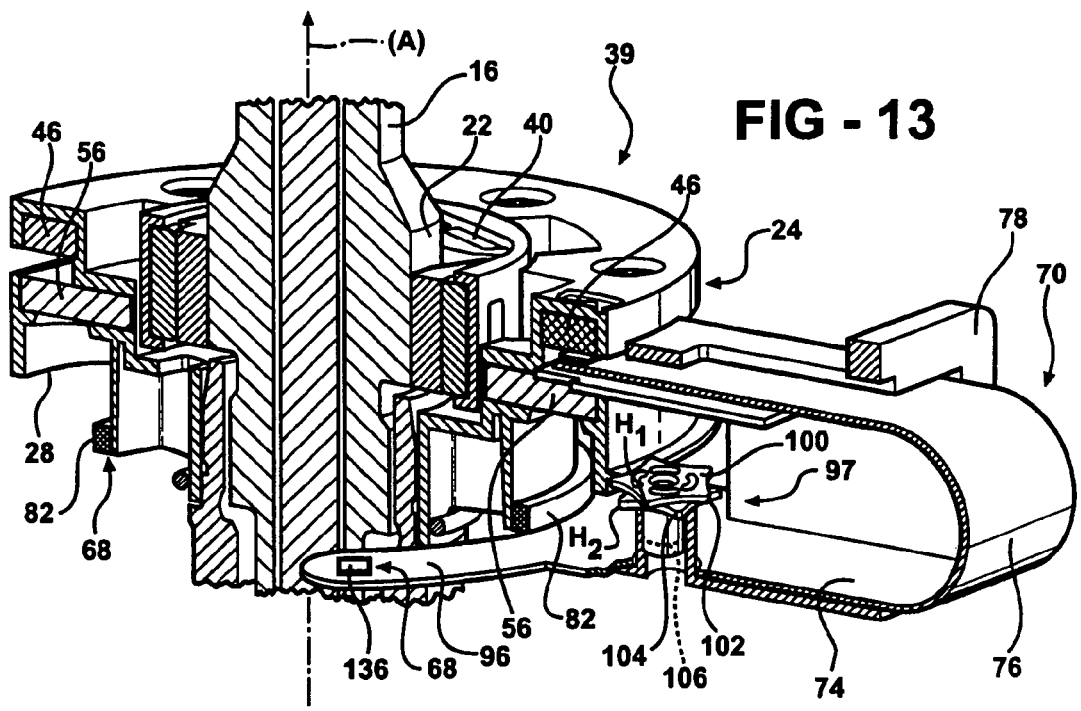
FIG. 13 is a first cross sectional view of the integrated torque and position sensor.
Figure 14:
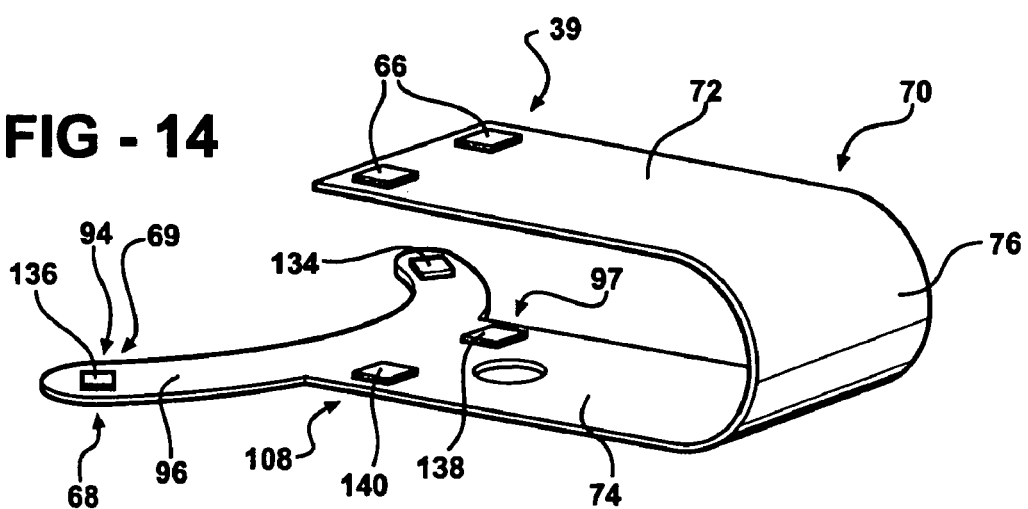
FIG. 14 is an elevated view of the circuit board including the incremental and the segment magneto-sensitive elements.

Referring to FIGS. 2, 13 and 14, a portion of the torque sensing mechanism 39 includes at least one torque magneto-sensitive element 66 for measuring the magnetic flux generated by the magnets 40. As discussed above, the teeth 54, 64 of the first torque stator 46 and the second torque stator 56 are offset or out of phase with each other. A magnetic flux is measured by the torque magneto-sensitive elements 66 and varies depending on the alignment of the magnets 40 to the wheel 24 and the teeth 54, 64 of the first torque stator 46 and the second torque stator 56.

The magnetic flux generated by each magnet 40 flows through the stators 46, 56, the support structures 42 of the back iron and through the gap (G). The magnetic circuit that is formed by the magnets 40 has mainly two regions, an upper magnetic zone that is formed between the magnets 40 and the first torque stator 46, and a lower magnetic zone is formed between the magnets 40 and the second torque stator 56. The differential magnetic flux between these two zones flows through the gap (G) and is sensed by the torque magneto-sensitive elements 66. The differential magnetic flux is indicative of the relative rotation between the input shaft 16 and the output shaft 18. At a no load torque condition, both of the zones produce the same amount of flux resulting in a zero differential flux.

Figure 9:
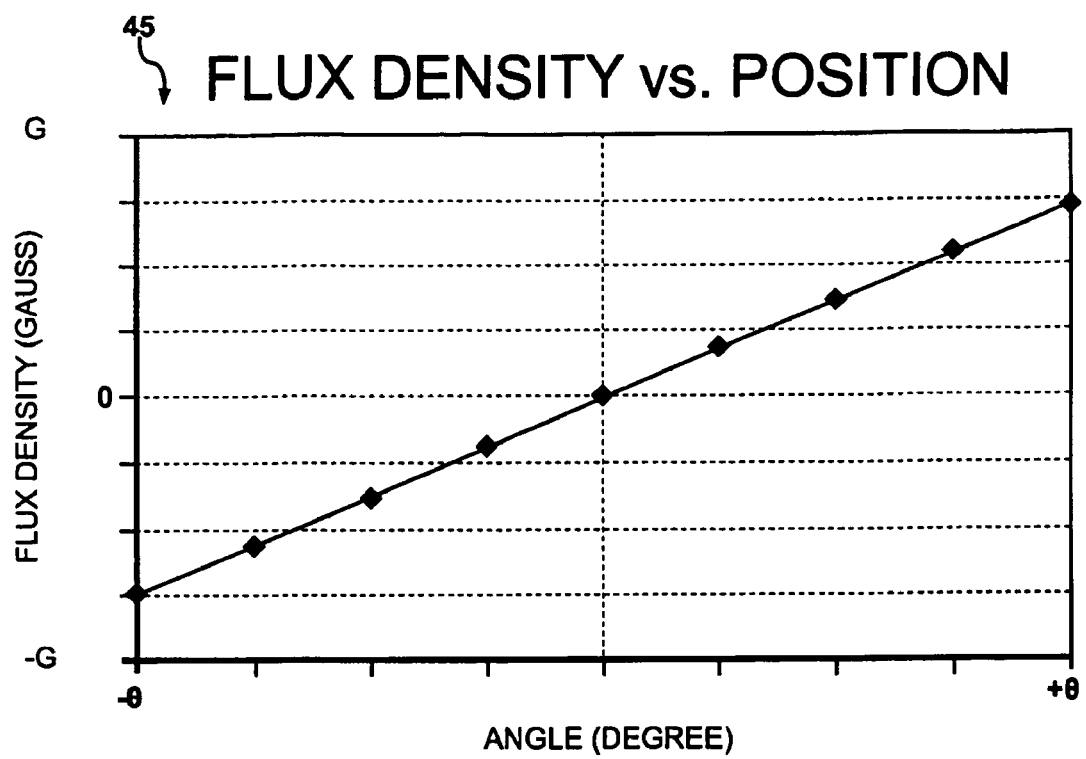
FIG. 9 is a graph illustrating the angle of relative displacement between the input shaft and the output shaft versus the flux density generated in the measurement gap.
Figure 10:
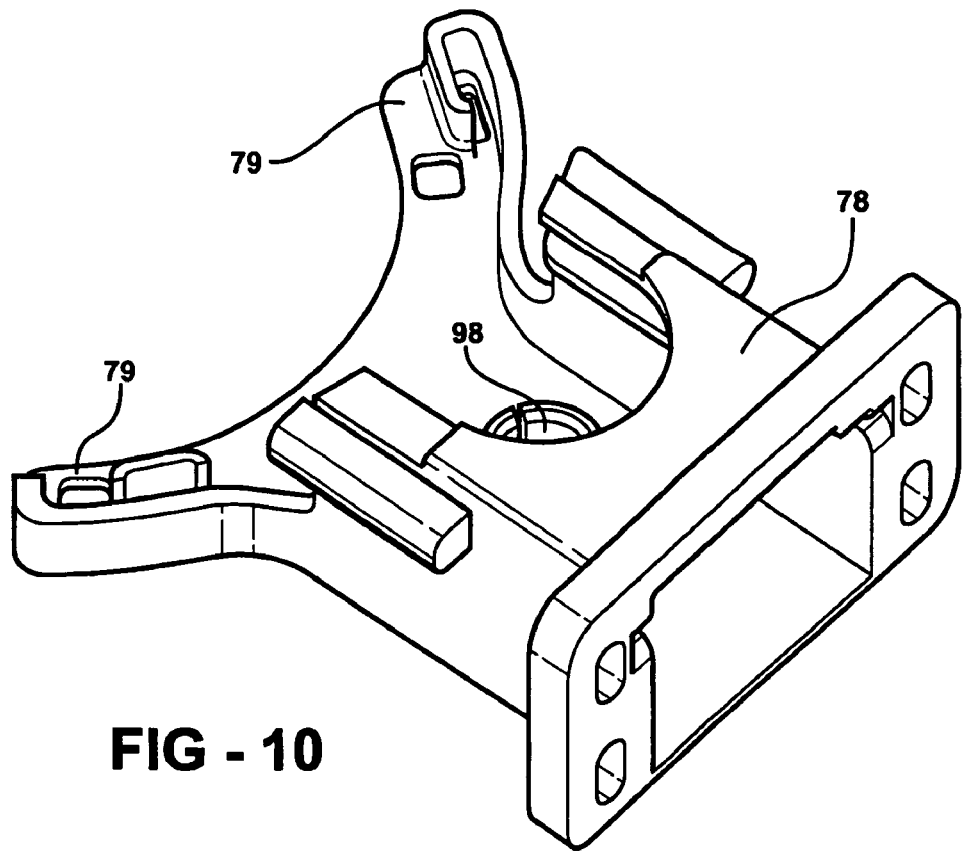
FIG. 10 is an elevated view of the sensor casing.

As shown in FIG. 9, a plot of the flux density of the magnets 40 versus the relative rotational displacement of the shafts 16, 18 is generally shown at 45. The relative rotation between the input shaft 16 and the output shaft 18 may vary between an angle of +/−θ with an associated +/−G Gauss. In one embodiment, the relative rotation between the input shaft 16 and the output shaft 18 may vary between an angle of +/−8 degrees. Depending on relative rotational displacement between the input shaft 16 and the output shaft 18, the differential flux either flows up or down in the gap (G).

Referring to FIGS. 1 and 10–14, the integrated sensor 10 includes a circuit board 70 and a sensor casing 78. The sensor casing 78 supports the circuit board 70. The circuit board 70 includes a torque leg 72, a position leg 74 and a flexible portion 76 positioned therebetween. The position leg 74 will be discussed in more detail below. The torque magneto-sensitive elements 66 are disposed on the torque leg 72 and positioned within the gap (G) for sensing a change in the magnetic flux. As shown in FIG. 1, the sensor casing 78 is supported by the sensor housing 14 which is mounted to a stationary member (not shown) and serves to retain the sensor casing 78 in proximal distance with the wheel 24 and the input shaft 16 and the output shaft 18. As shown in FIGS. 1–2, a support board 80 is positioned underneath the torque leg 72 for preventing the torque leg 72 from flexing. A wire harness (not shown) delivers signals to and from a microcontroller to the integrated sensor 10.

Position Sensing

The angle position sensing capability of the integrated sensor 10 measures the angle position of the output shaft 18, or shaft 18. The integrated sensor 10 includes an incremental sensing mechanism 68 that detects the angular position of the shaft 18 and is indicative of the incremental angular rotation or the angular position of the shaft 18 between any angle of 0 and 360 degrees.

Referring to FIG. 2, the incremental sensing mechanism 68 includes a ring magnet 82. The ring magnet 82 further includes a first side 84 and a second side 86. The first side 84 of the ring magnet 82 is coupled to the second side 28 of the wheel 24 and is axially spaced from the first torque stator 46 and the second torque stator 56. Accordingly, the ring magnet 82 rotates with the wheel 24 for generating a magnetic flux which corresponds to the incremental phase angle of the shaft 18.

Figure 15:
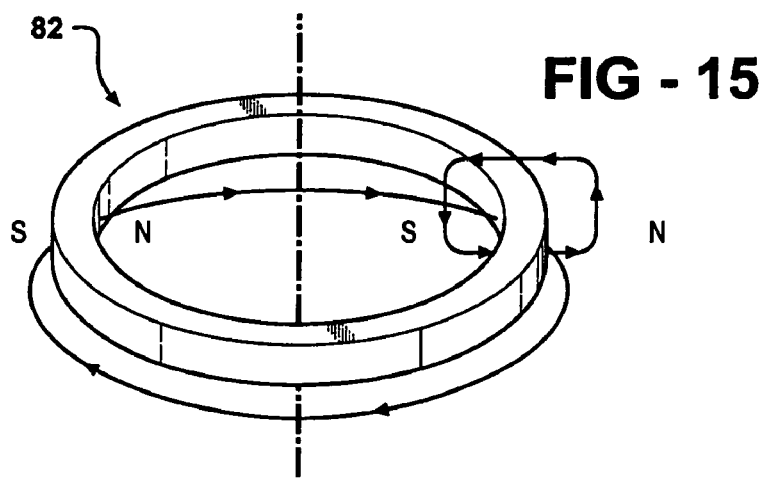
FIG. 15 is an elevated view of the ring magnet.

Referring to FIG. 15, the ring magnet 82 is diametrically magnetized wherein one half of the ring magnet 82 includes north poles and the other half of the ring magnet 82 includes south poles. The flux lines flow radially and axially from the north to the south poles.

Referring to FIGS. 2, 12 and 14, a portion of the incremental sensing mechanism 68 includes at least one incremental magneto-sensitive element 94 for detecting the magnetic flux of the ring magnet 82. As stated above, the circuit board 70 includes the torque leg 72 and the position leg 74 wherein the torque leg 72 and the position leg 74 are axially spaced from each other. The position leg 74 includes a pair of circumferentially extending arms 96 positioned adjacent the wheel 24. The sensor casing 78 further includes a pair of casing arms 79 that support the extending arms 96 of the circuit board 70. The incremental magneto-sensitive elements 94 are circumferentially positioned from each other and disposed on the extending arms 96.

Referring to FIGS. 10–13, the sensor casing 78 defines a gear cavity 98. The integrated sensor 10 further includes a segment sensing mechanism 97. The segment sensing mechanism 97 includes a change gear 100 having change teeth 101 rotatably received and supported by the gear cavity 98.

Figure 16:
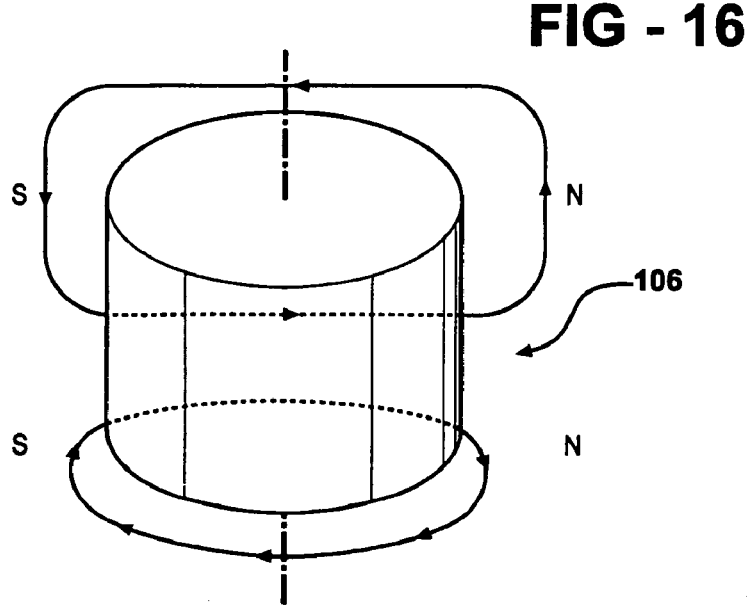
FIG. 16 is an elevated view of the segment magnet.

Referring to FIGS. 11–14, the segment sensing mechanism 97 further includes a segment magnet 106. In the illustrated embodiment, the segment magnet is in the shape of a disc, however the segment magnet 106 may be in the form of a ring, rhombus or square. A portion of the segment sensing mechanism 97 includes at least one segment magneto-sensitive element 108. The segment magnet 106 is coupled to the change gear 100 wherein both the change gear 100 and segment magnet 106 are rotatably received and supported by the gear cavity 98. The segment magnet 106 may be coupled to the change gear 100 by injection molding. The segment magneto-sensitive elements 108 are disposed adjacent the segment magnet 106 on the position leg 74 of the circuit board 70. As shown in FIG. 16, the segment magnet 106 is diametrically magnetized wherein one half of the segment magnet 106 includes north poles and the other half of the segment magnet 106 includes south poles. The flux lines flow radially and axially from the north to the south poles. As the change gear 100 rotates, the segment magnet 106 rotates, resulting in a change in the magnetic flux which is detected by the segment magneto-sensitive elements 108. As stated above, the position of the change gear 100 is indicative of the revolution in which the shaft 18 is disposed.

Figure 17:
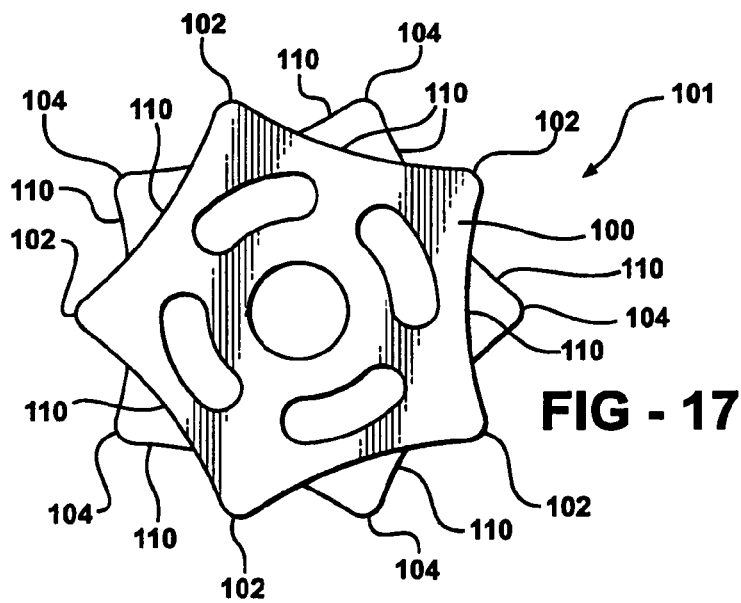
FIG. 17 is a top view of the change gear.

Referring to FIGS. 2, 13 and 17, the change teeth 101 includes a first plurality of change teeth 102 disposed on a first plane (H1) and a second plurality of change teeth 104 disposed on a second plane (H2). The first plurality of change teeth 102 and the second plurality of change teeth 104 are parallel and axially spaced from each other. Additionally, the first plurality of change teeth 102 are out of phase or not angularly aligned with the second plurality of change teeth 104. As shown in FIG. 17, the first plurality of change teeth 102 and the second plurality of change teeth 104 each include five teeth. The change gear 100 may be configured to include any number of change teeth and may be disposed on any number of planes. An engagement surface 110 is positioned between each of the five change teeth for the first plurality of change teeth 102 and for the second plurality of change teeth 104.

Figure 18:
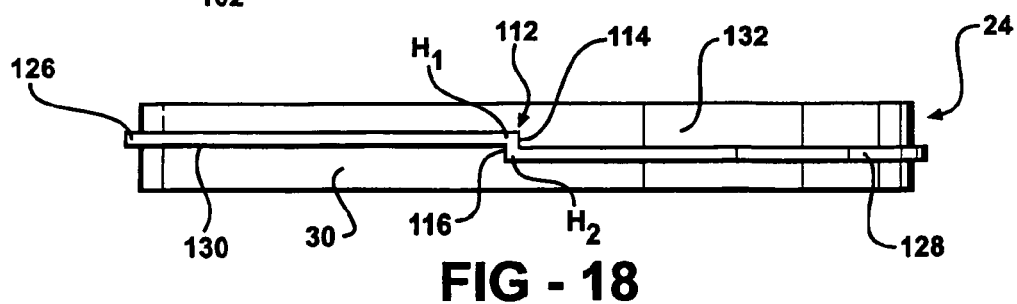
FIG. 18 is a side view of the wheel.
Figure 20:
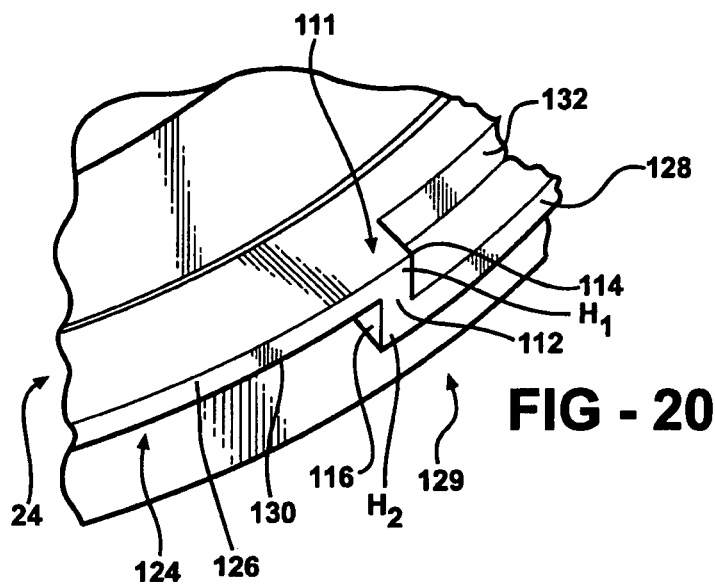
FIG. 20 is a second elevated view of the blocking cams of the wheel positioned one hundred and eighty degrees from the blocking cams of FIG. 20.

Referring to FIGS. 18 and 20, drive teeth 111 are disposed on the middle portion 30 of the wheel 24. The drive teeth 111 includes a first pair of drive teeth 112. The first pair of drive teeth includes a first drive tooth 114 positioned on the first plane (H1) on the middle portion 30 of the wheel 24 and a second drive tooth 116 positioned on the second plane (H2) on the middle portion 30 of the wheel 24.

Figure 19:
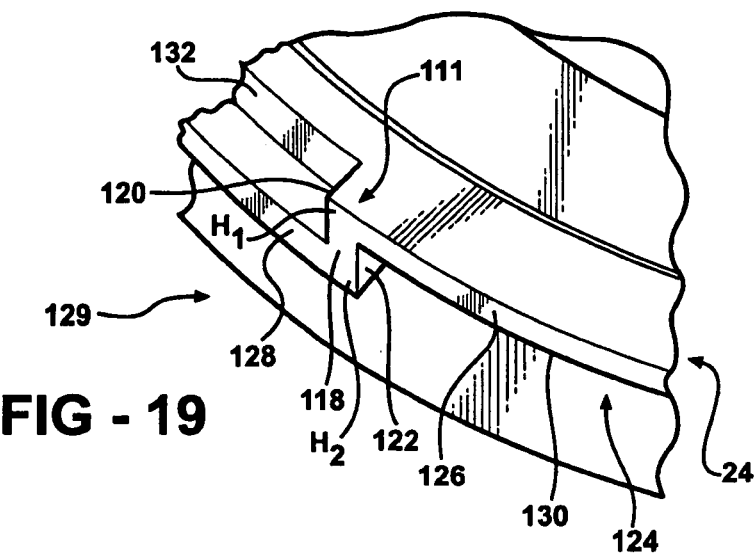
FIG. 19 is a first elevated view of the blocking cams of the wheel.

Referring to FIG. 19, a second pair of drive teeth 118 is disposed on the wheel 24 one hundred and eighty degrees from the first pair of drive teeth 112. Likewise, the second pair of drive teeth 118 includes a first drive tooth 120 disposed on the first plane and a second drive tooth 122 disposed on the second plane. The wheel 24 may be configured to include more drive teeth and the pairs of drive teeth 112, 118 may be positioned at any angle from each other.

Referring to FIGS. 19–20, a plurality of blocking cams 124 are positioned on the middle portion 30 of the wheel 24. More specifically, a first blocking cam 126 is positioned on the first plane of the middle portion 30 between the first drive teeth 114, 120 for the first pair of drive teeth 112 and for the second pair of drive teeth 118. The first blocking cam 126 extends through one hundred and eighty degrees on one diametrical side of the wheel 24. Additionally, a second blocking cam 128 is positioned on the second plane of the middle portion 30 between the second drive teeth 116, 122 for each of the first pair of drive teeth 112 and the second pair of drive teeth 118. The second blocking cam 128 extends through the other one hundred and eighty degrees on the other diametrical side of the wheel 24. The first pair of drive teeth 112 and the second pair of drive teeth 118 define a plurality of ends of the blocking cams 124. The integrated sensor 10 further includes an actuation mechanism 129. The actuation mechanism 129 includes the first pair of drive teeth 112 and the second pair of drive teeth 118, the blocking cams 124, and the first plurality of change teeth 102 and the second plurality of change teeth 104.

Figure 21:
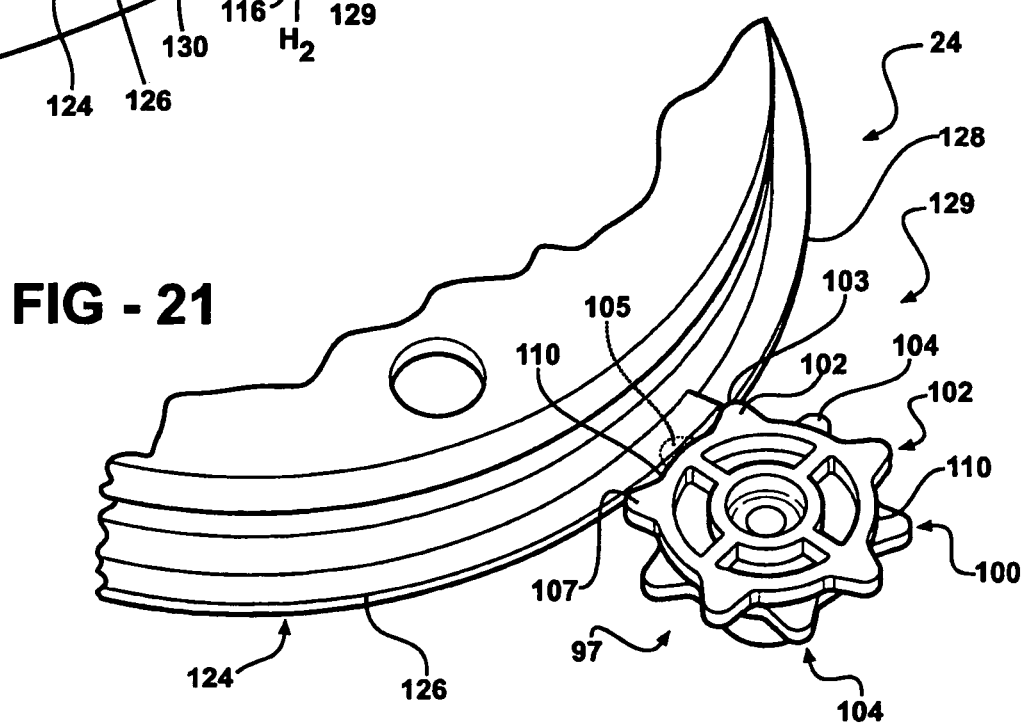
FIG. 21 is an elevated view of the wheel and the change gear illustrating the engagement surfaces between the first plurality of change teeth engaged with the first blocking cam.
Figure 23:
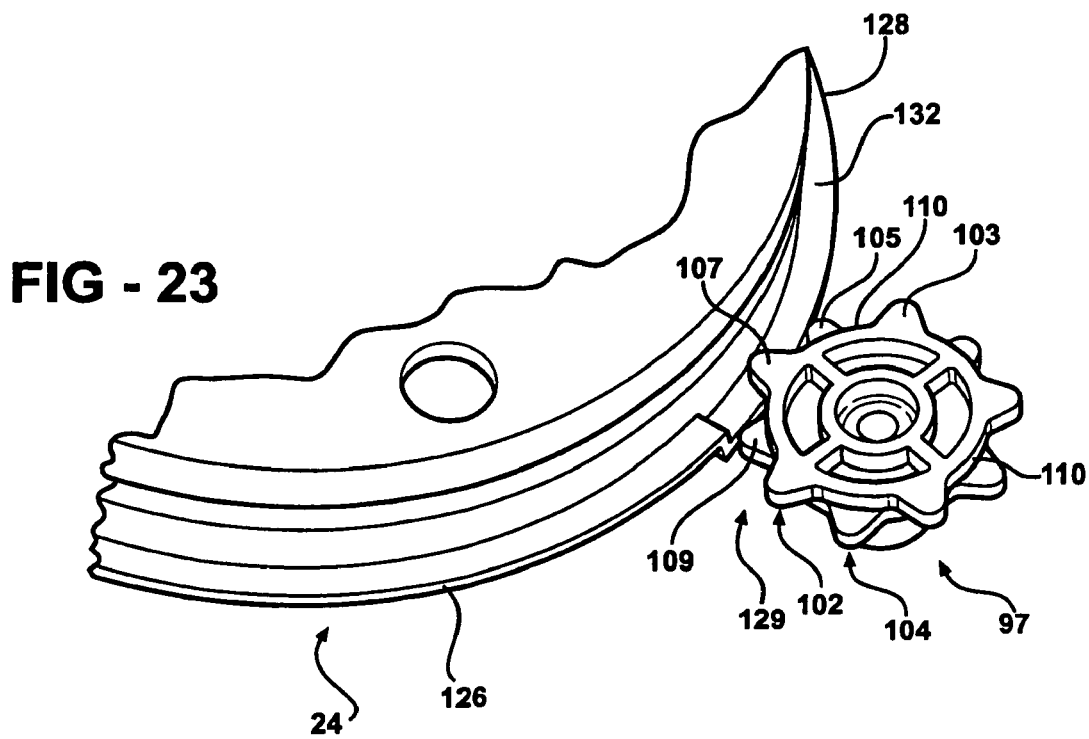
FIG. 23 is an elevated view of the wheel and the change gear illustrating one of the teeth on the first plurality of change teeth disposed in the second channel of the wheel.
Figure 24:
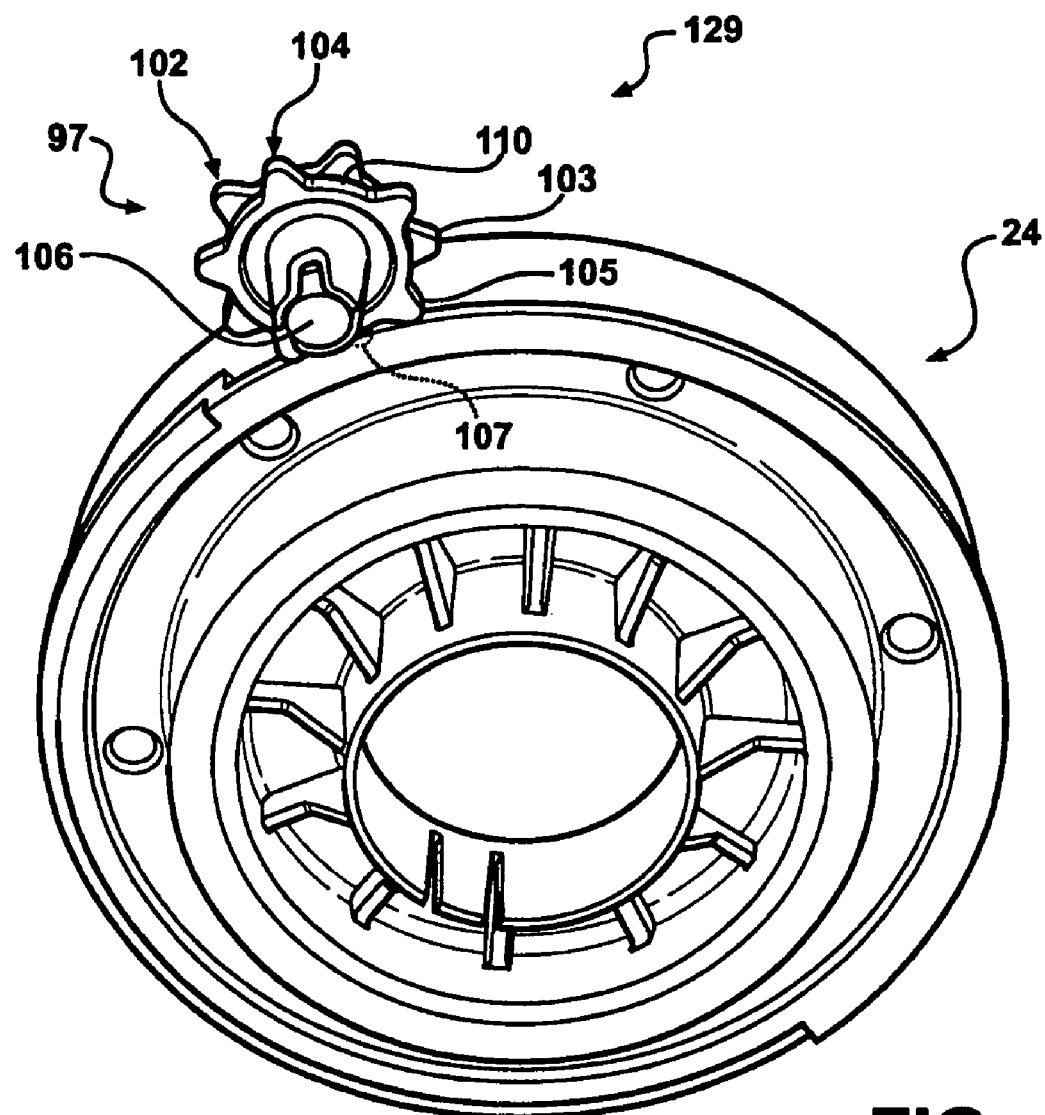
FIG. 24 is an elevated view from the bottom side of FIG. 23 illustrating the engagement surfaces between the second plurality of change teeth engaged with the second blocking cam.

Referring to FIGS. 21 and 23–24, the actuation mechanism 129 interconnects the wheel 24 and the change gear 100 when the wheel 24 rotates completely through a predetermined number of increments. Meaning, that for every one hundred and eighty degrees of rotation of the wheel 24, either the first pair of drive teeth 112 engages with either one change tooth 103 in the first plurality of change teeth 102 or one change tooth 105 in the second plurality of change teeth 104, or the second pair of drive teeth 118 engages with either one change tooth 103 in the first plurality of change teeth 102 or one change tooth 105 in the second plurality of change teeth 104 for rotating the change gear 100 through a predetermined angle of thirty six degrees. One skilled in the art will recognize that a change gear 100 may be provided with any number of change teeth. For example, ten change teeth may be used for the first plurality of change teeth 102 and the second plurality of change teeth 104 resulting in a total of twenty teeth and rotating the change gear 100 eighteen degrees upon each occurrence of the drive teeth 112 engaging one of the change teeth in either the first plurality of change teeth 102 or the second plurality of change teeth 104.

As shown in FIGS. 19–20, the first blocking cam 126 and the second blocking cam 128 are axially spaced and parallel to each other. A first channel 130 is disposed below the first blocking cam 126, and a second channel 132 is disposed above the second blocking cam 128.

Figure 22:
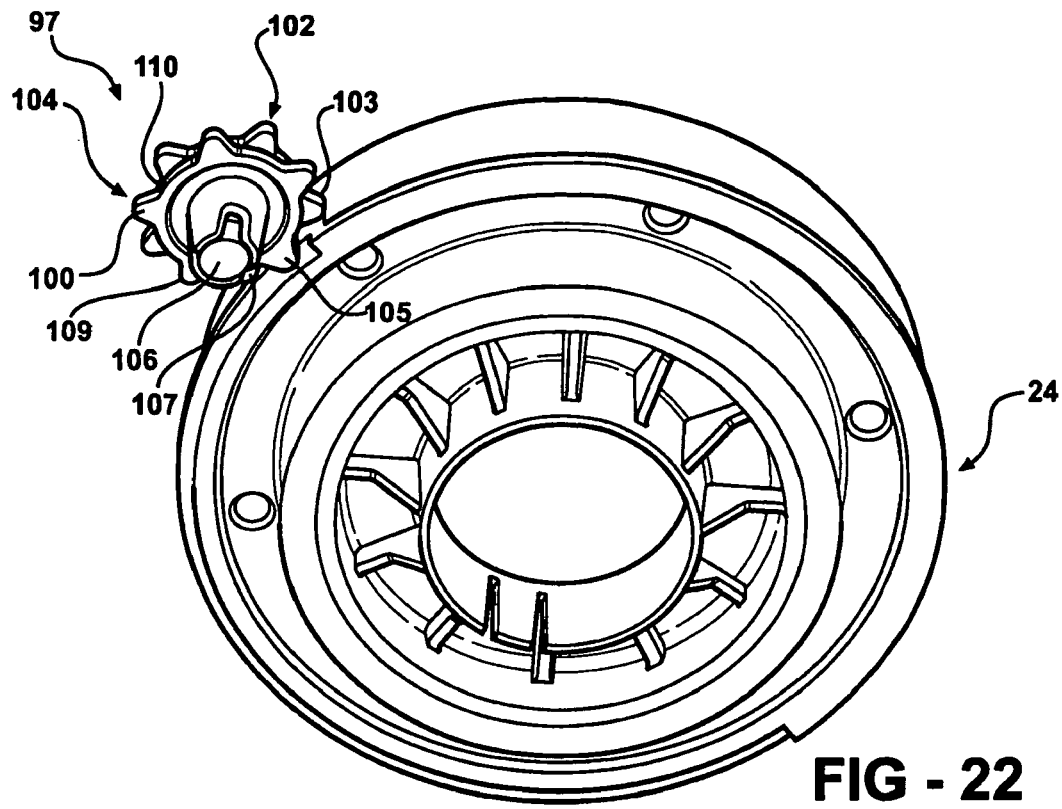
FIG. 22 is an elevated view from the bottom side of FIG. 21 illustrating the location of one of the teeth on the second plurality of change teeth being disposed in the first channel.

Referring to FIGS. 21–22, (assuming that this is the initial condition in which the shaft 18 is disposed in terms of the angular position of the shaft 18), a first change tooth 105 from the second plurality of change teeth 104 is positioned in the first channel 130 below the first blocking cam 126. The engagement surface 110 disposed between a first change tooth 103 and a second change tooth 107 on the first plurality of change teeth 102 engages the first blocking cam 126 for preventing rotation of the wheel 24. Referring to FIGS. 19, 21–22, after rotating the shaft 18 counterclockwise through an angle in excess of one hundred and eighty degrees and below an angle of three hundred and sixty degrees, the change gear 100 rotates thirty six degrees when the second drive tooth 122 of the second pair of drive teeth 118 engages with the change tooth 105 disposed in the second plurality of change teeth 104.

Referring to FIGS. 23–24, after the change gear 100 rotates thirty six degrees, the second change tooth 107 in the first plurality of change teeth 102 is rotated into the second channel 132 above the second blocking cam 128 and the engagement surface 110 between the first change tooth 105 and the second change tooth 109 disposed in the second plurality of change teeth 104 engages with the second blocking 128 cam for preventing rotation of the change gear 100 until the wheel 24 rotates through another one hundred and eighty degrees of rotation.

Referring to FIGS. 20–21, in response to rotating the wheel 24 to an angle less than one hundred and eighty degrees in the clockwise direction, the first drive tooth 116 of the first pair of drive teeth 112 would engage the first change tooth 105 of the second plurality of change teeth 104 and result in rotating the change gear 100 an additional thirty six degrees.

Whenever the shaft 18 is rotated to any angle which is not equal to a multiple of one hundred and eighty degrees the either the first blocking cam 126 engages with the engagement surface 110 disposed on the first plurality of change teeth 102 or the second blocking cam 128 engages with the engagement surface 110 disposed on the second plurality of change teeth 104.

Referring to FIGS. 13–14, and as stated above, the incremental magneto-sensitive elements 94 are disposed on the extending arms 96 of the position leg 74 and are spaced both axially and radially from the ring magnet 82. The incremental magneto-sensitive elements 94 includes a first incremental magneto-sensitive element 134 and a second incremental magneto-sensitive element 136. The incremental magneto-sensitive elements 134, 136 output an incremental output that correlates to an angle of between 0 and 360 degrees. The incremental output includes a first incremental output, $P_1$, and a second incremental output, $P_2$. The first incremental output, $P_1$, is generated from the first incremental magneto-sensitive element 134, and the second incremental output, $P_2$, is generated from the second incremental magneto-sensitive element 136.

Figure 25:
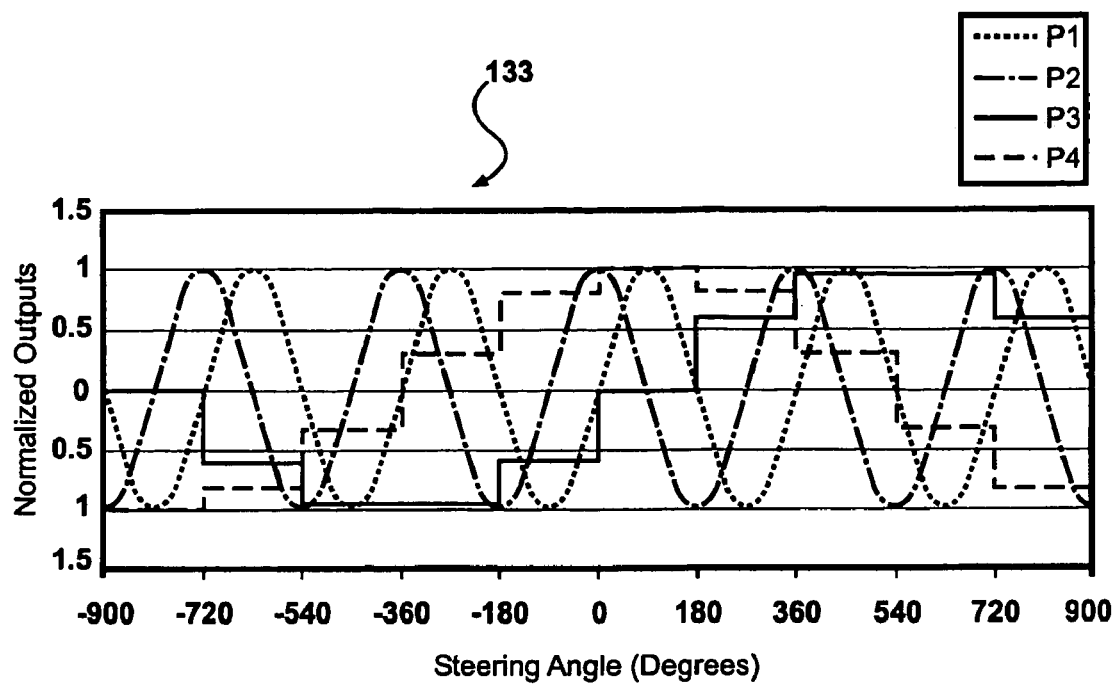
FIG. 25 is a graph illustrating the waveforms for the incremental outputs $P_1$ and $P_2$; and the waveforms for the segment outputs $P_3$ and $P_4$.

Referring to FIG. 25, the incremental and segment outputs are generally shown at 133, the first incremental output, $P_1$, is defined by a sinusoidal voltage output and the second incremental output, $P_2$, is defined by a cosinusoidal voltage output. The incremental outputs $P_1$ and $P_2$ are defined by following equations:

$$P_1 = A_1 \sin \theta_1 \qquad (a)$$

$$P_2 = B_2 \cos(\theta_1 + \delta_{1,2}) \qquad (b)$$

The variables $A_1$ and $B_2$ are defined as a first incremental amplitude and a second incremental amplitude, respectively. The angle $\theta_1$ is the incremental phase angle of the shaft and $\delta_{1,2}$ is defined as an incremental quadrature error angle. Ideally, $P_1$ and $P_2$ are shifted ninety degrees from each other and the incremental quadrature error angle is equal to zero.

As stated above, the segment magneto-sensitive elements 108 are disposed on the torque leg 72 of the circuit board 70. A first segment magneto-sensitive element 138 and a second segment magneto-sensitive element 140 output a segment output which correlates to an angle of between 0 and 360 degrees. The segment output will be used to provide the segment or revolution in which the shaft 18 or the wheel 24 is disposed. The segment output includes a first segment output, $P_3$, which is an output produced from the first segment magneto-sensitive element 138 and a second segment output, $P_4$, which is an output produced from the second segment magneto-sensitive element 140.

Referring to FIG. 25, the first segment output, $P_3$, is defined by a stepped sinusoidal voltage output and the second segment output, $P_4$, is defined by a stepped cosinusoidal voltage output. The segment outputs, $P_3$ and $P_4$, are defined by the following equations:

$$P_3 = A_3 \sin \theta_2 \qquad (c)$$

$$P_4 = B_4 \cos(\theta_2 + \delta_{3,4}) \qquad (d)$$

The variables $A_3$ and $B_4$ are defined as a first segment amplitude and a second segment amplitude, respectively. The angle $\theta_2$ is the segment phase angle is the angle position of the shaft and $\delta_{3,4}$ is defined as a segment quadrature error angle. Preferably, $P_3$ and $P_4$ are shifted ninety degrees from each other and the segment quadrature error angle is equal to zero.

Figure 26:
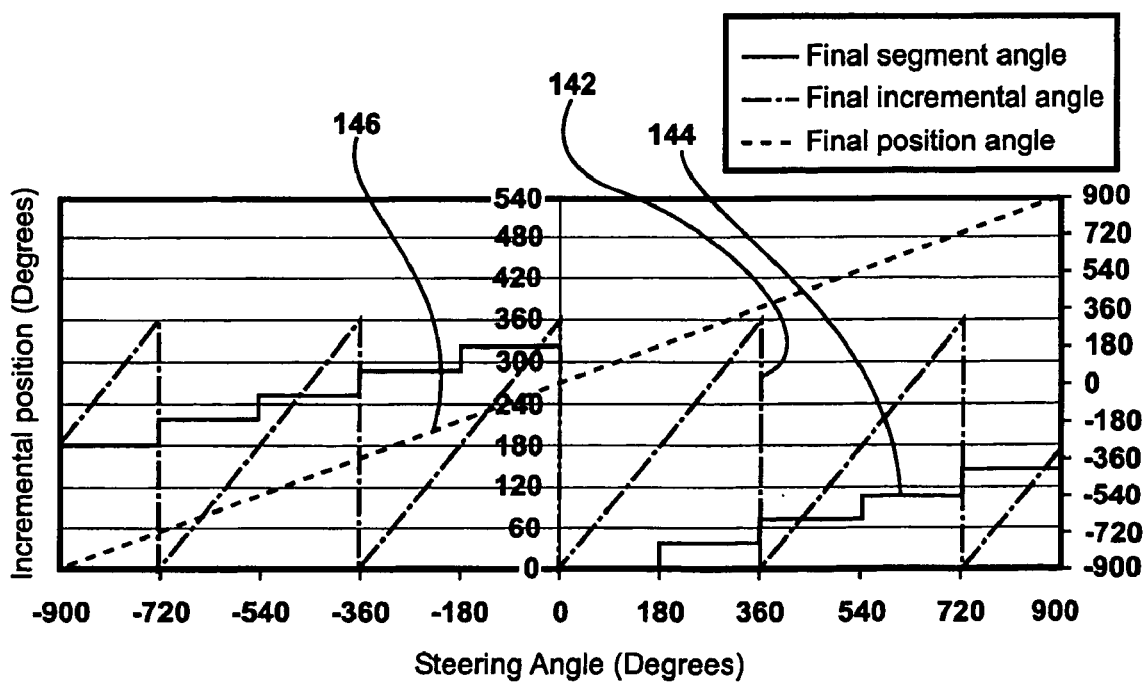
FIG. 26 is a graph of the final incremental angle and the final segment angle and the corresponding final angle position after calculating the final angle position with the solver equation and the algorithm.

As shown in FIG. 26, a solver equation uses the outputs $P_1$ and $P_2$ to calculate and produce a final incremental angle position of 0 to 360 degrees for the shaft 18. Likewise, the solver equation uses outputs $P_3$ and $P_4$ to calculate and produce a final segment angle position which comprises actual segment angles between 0 and 360 degrees. This interaction between the final incremental angle position and the final segment angle position will be discussed in more detail after the derivation for the solver equation is shown. The solver equation is defined as:

$$\varphi_{old} = \varphi_{old} - \left( \frac{f(\theta, \varphi)}{\frac{df(\theta, \varphi)}{d\varphi}} \right) \quad (e)$$

To show the derivation of the solver equation, the amplitudes $A_1$, $A_3$ will be defined by $A_m$ and the amplitudes $B_2$, $B_4$ will be defined by $B_m$. The angles $\theta_1$ and $\theta_2$ are defined by the angle $\theta_m$. Finally, the quadrature error angles $\delta_{1,2}$ and $\delta_{3,4}$ are defined as $\delta$.

The equations (a), (b), (c), and (d) may be rewritten as:

$$P_1(\text{or } P_3) = A_m \sin \theta_m \quad (f)$$

$$P_2(\text{or } P_4) = B_m \cos(\theta_m + \delta) \quad (g)$$

It is important to note that $P_1$ and $P_3$ are not equal to each other. Likewise, $P_2$ and $P_4$ are not equal to each other. The purpose of writing equations (f) and (g) is to show that the same derivation for establishing the application of the solver equation using the outputs $P_1$ and $P_2$ also applies to the outputs $P_3$ and $P_4$.

Due to tolerances created in the manufacture of various components used in the integrated sensor, it is necessary to generate an equation where $A_m = B_m$. Additionally, it is necessary to ensure that a phase shift of ninety degrees exists between the sinusoidal and cosinusodial outputs.

A gain factor of $$\frac{A_m}{B_m}$$

is multiplied to equation (g) for generating the following equation:

$$\frac{A_m}{B_m} P_2(\text{or } P_4) = \frac{A_m}{B_m}(\cos\theta_m \cos\delta - \sin\theta_m \sin\delta) B_m \quad (h)$$

$$= A_m \cos\theta_m \cos\delta - A \sin\theta_m \sin\delta$$

$$\frac{A_m}{B_m} P_2(\text{or } P_4) = A_m \cos\theta_m \cos\delta - P_1(\text{or } P_3)\sin\delta$$

Equation (h) may be re-written using equations (f) and (g):

$$A_m \cos\theta_m \cos\delta = \frac{A_m}{B_m} P_2(\text{or } P_4) + P_1(\text{or } P_3)\sin\delta \quad (i)$$

In solving for $A_m \cos \theta_m$ in equation (i), equation (j) is produced resulting in an equation that represents the different amplitude $B_m$ and the error angle $\delta$ in the form of a common amplitude $A_m$.

$$A_m \cos\theta_m = \frac{\left( \frac{A_m}{B_m} P_2(\text{or } P_4) + P_1(\text{or } P_3)\sin\delta \right)}{\cos\delta} \quad (j)$$

By arbitrarily setting $P'_2$(or $P'_4$) to $A_m \cos \theta_m$, it is possible to define the numerator of the solver equation as follows:

$$f(\theta_m, \phi) = P_1(\text{or } P_3)\cos \phi - P'_2(\text{or } P'_4)\sin \phi = A_m \sin(\theta_m - \phi) = 0 \quad (k)$$

equation (k) is rewritten as;

$$f(\theta_m, \phi) = A_m \sin \theta_m \cos \phi - A_m \cos \theta_m \sin \phi = A_m \sin(\theta_m - \phi) = 0 \quad (l)$$

The angle $\phi$ is selected to set equation (l) to zero, accordingly by setting angle $\phi = \theta_m$, this satisfies the condition that $f(\theta_m, \phi) = 0$.

The denominator for the solver equation is defined as the following:

$$\frac{df}{d\varphi}(\theta_m, \varphi) = -P_1(\text{or } P_3)\sin\varphi - P'_2(\text{or } P'_4)\cos\varphi \quad (m)$$

The solver equation is shown as the following after substituting equations (l) and (m) into equation (e):

$$\varphi_{new} = \varphi_{old} - \left( \frac{P_1(\text{or } P_3)\cos\varphi - P'_2(\text{or } P'_4)\sin\varphi}{-P_1(\text{or } P_3)\sin\varphi - P'_2(\text{or } P'_4)\cos\varphi} \right) \quad (n)$$

Accordingly, $\phi_{old}$ is an initial angle value which is arbitrarily set to any angle between 0 and 360 degrees, after $\phi_{old}$ is inserted into the solver equation (n), an angle $\phi_{new}$ is produced, if the angle $\phi_{new}$ is not a pre-determined angle, angle $\phi_{new}$ is set to $\phi_{old}$, and equation (n) is solved again generating a new angle $\phi_{new}$. Depending on which of the outputs $P_1$, $P_2$, $P_3$, $P_4$ were inserted into the solver equation (n), the converged angle $\phi_{new}$ is assigned to either a final incremental angle position or a final segment angle. If the outputs $P_1$, $P_2$ were inserted into the solver equation (n), the converged angle $\phi_{new}$ is set to the final incremental angle and the output is any angle between 0 and 360 degrees. If $P_3$, $P_4$ was inserted in the solver equation (n), then the converged angle $\phi_{new}$ is set to the actual segment angle.

A total of five actual segment angles correspond to the five change teeth of the first plurality of change teeth 102. Likewise, five actual segment angles correspond to the five change teeth of the second plurality of change teeth 104. As either the first pair of drive teeth 112 or the second pair of drive teeth 118 engages with any change tooth 103 of the first plurality of change teeth 102 or any change tooth 105 of the second plurality of change teeth 104, the change gear 100 and the segment magnet 106 is rotated a total of thirty six degrees in either direction. In response to the segment magnet 106 being rotated by thirty six degrees, new values for $P_3$ and $P_4$ are outputted from the segment magnetosensitive elements 138, 140 and inserted into the solver equation (n) for producing the actual segment angle. As the user rotates the shaft 18 over the full range of shaft travel of +/−900 degrees, the wheel 24 engages the change teeth 102,104 every one hundred and eighty degrees or ten times (total angular rotation of shaft/# of change teeth) resulting in a total of ten final segment angles. The selection of the number of change teeth is calculated by taking the total angular travel of the shaft 18 divided by the angle between the first pair of drive teeth 112 and the second pair of drive teeth 118. Accordingly, the selection of ten teeth dictates the number of steps represented in the sinusoidal and cosinusodial outputs of $P_3$ and $P_4$ respectively. Every two turns of the segment magnet 106 is indicative of a new revolution in which the shaft 18 is disposed. As stated earlier, one skilled in the art will recognize that a change gear 100 with five change teeth would result in the drive teeth engaging the change teeth every three hundred and sixty degrees. As a result, a total of five final segment angles would be utilized.

Upon rotating the shaft 18, the ring magnet 82 rotates in the same direction generating a new set of output values $P_1$ and $P_2$. The incremental outputs $P_1$ and $P_2$ are then applied to the solver equation (n) for producing the final incremental angle.

An algorithm uses the actual segment angle to produce the final segment angle (FinalSegAng) and a final angle position equation determines a final angle position (FinalPos). The algorithm and the final angle position equation are defined by equations (o) and (p) respectively:

$$\text{Actual Segment Angle} - \Delta\theta \leq \text{FinalSegAng} \leq \text{Actual Segment Angle} + \Delta\theta \quad (o)$$

$$\text{FinalPos} = \text{FinalIncAng} + n \cdot 360 \text{ degrees} \quad (p)$$

for n=+(0, 1, 2, 3)

The FinalSegAng includes ten angles and each angle corresponds to an integer n. The FinalSeqAng and corresponding integer n are shown in Table 1:

TABLE 1

| FinalSegAng | Integer(n) |
|---|---|
| 0 | 0 |
| 36 | 0 |
| 72 | 1 |
| 108 | 1 |
| 144 | 2 |
| 180 | -3 |
| 216 | -2 |
| 252 | -2 |
| 288 | -1 |
| 324 | -1 |

It should be noted that anyone skilled in the art may derive different final segment angles (FinalSeqAng) other than those defined in Table 1 and may also assign different integers to the FinalSegAng. The actual segment angle which is produced from the solver equation (n) will ultimately converge on any of the final segment angles with the tolerance $\Delta\theta$. After the final segment angle has been determined by matching the actual segment angle, the integer n is determined, and n and the FinalIncAngle produced by the solver equation (n) using outputs $P_1$, and $P_2$ are inserted into the final angle position equation (p) to produce the final position angle (FinalPos). Ideally, each final segment angle is configured to represent each change tooth on the change gear 106. As the number of change teeth utilized on the change gear either increase or decrease, the number of final segment angles used will decrease or increase. Accordingly, the final position angle (FinalPos) is an angle between +/−900 degrees and is indicative of the angle in which the shaft 18 is disposed. These values depend on the initial position of the shaft 18 and the change gear 100. The calculation of the final position angle of between +/−900 may extend to a larger angle and may also be smaller than +/−900. The limit of the final angle position will depend on the number of change teeth utilized on the change gear 106.

Each of the calculated final segment angles generated by the solver equation (n) has a tolerance of +/−18 degrees, which is equivalent to the angle rotation of the change gear at thirty six degrees. The calculation of the final incremental angle, the actual segment angle, the final segment angle and the final angle position will be performed on a device not included with the integrated sensor 10. The device may include a controller electrically coupled to the integrated sensor 10 which receives the outputs $P_1$, $P_2$, $P_3$, $P_4$. Referring to FIG. 25, the raw data, as generated from the incremental magneto-sensitive elements 94 and the segment magneto-sensitive elements 108 $P_1$, $P_2$, $P_3$, $P_4$ is shown.

Referring to FIG. 26, each of the outputs $P_1$, $P_2$, $P_3$, $P_4$ is inserted into the solver equation and the resulting final incremental angle 142 and the final segment angle 144 are shown over the full angular rotation of the shaft 18. The final position angle 146 is generated after executing the algorithm and after solving the final position angle equation and is defined as any angle between +/−900 degrees.

Method of Calibrating and Compensating the Outputs of the Integrated Sensor

Due to tolerance issues or design variations of the various components utilized in the integrated sensor 10, different amplitudes may exist between $A_1$ and $B_2$ for the incremental outputs $P_1$ and $P_2$; and $A_3$ and $B_4$ for the segment outputs $P_3$ and $P_4$. Further, a ninety degrees phase shift between the angles may not exist between the incremental outputs $P_1$ and $P_2$ and the segment outputs $P_3$ and $P_4$. Other errors may lead to unbalanced amplitudes, positive and negative cycles may not be spanned over 180 degrees, and higher order harmonics may be present in the outputs $P_1$, $P_2$, $P_3$ and $P_4$. The sources of these errors or non-idealities may include, magnet anisotropies, cocking of either the ring magnet 82 or segment magnet 106 after assembly, variations between the incremental and the segment magneto-sensitive element's sensitivity (mV/G), and a voltage offset ($V_{OQ}$) variation. The voltage offset ($V_{OQ}$) is a produced by the magneto-sensitive elements.

Figure 27:
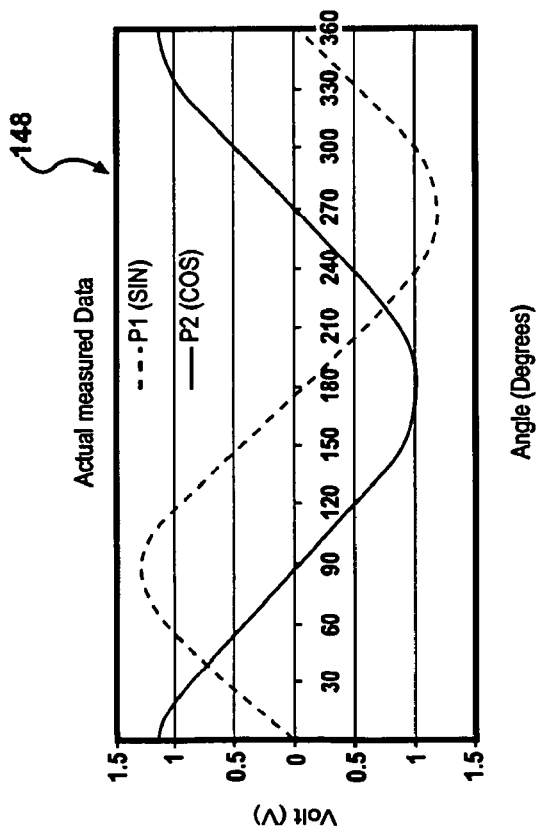
FIG. 27 is a graph of the actual measured incremental outputs of $P_1$ and $P_2$ prior to performing the compensation method.

Referring to FIG. 27, the incremental uncompensated waveforms 148 correspond to the outputs of the measured first incremental output $P_1$ and the measured second incremental output $P_2$. It illustrates how non-idealities may affect the resulting output waveforms 148. The amplitudes of the incremental outputs $P_1$ and $P_2$ each have different peak values, $P_1$ and $P_2$ are not phase shifted at ninety degrees and the waveforms 148 are not symmetrical.

Figure 33:
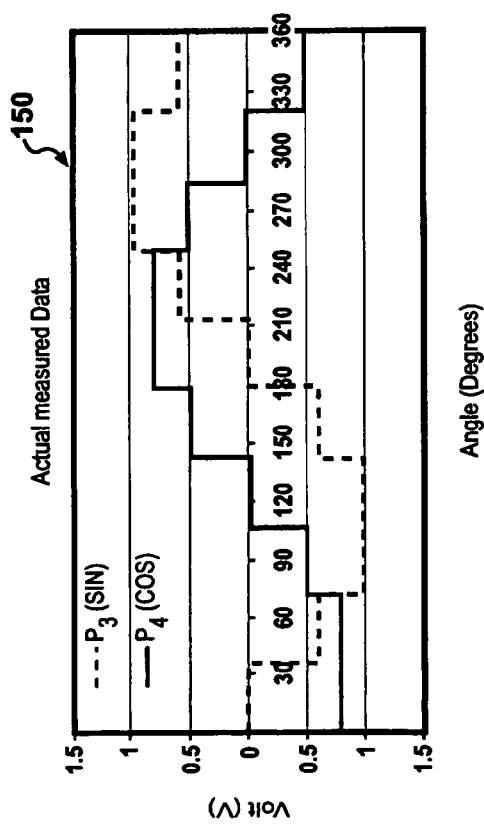
FIG. 33 is a graph of the actual measured segment outputs of $P_3$ and $P_4$ prior to performing the calibration method.

Referring to FIG. 33, the segment uncompensated waveforms 150 correspond to the outputs of the measured first segment output $P_3$ and the measured second segment output $P_4$. It illustrates how non-idealities may affect the resulting output waveforms 150. The amplitudes of the segment outputs $P_3$ and $P_4$ each have different peak values and $P_3$ and $P_4$ may not be phase shifted to ninety degrees.

Figure 29:
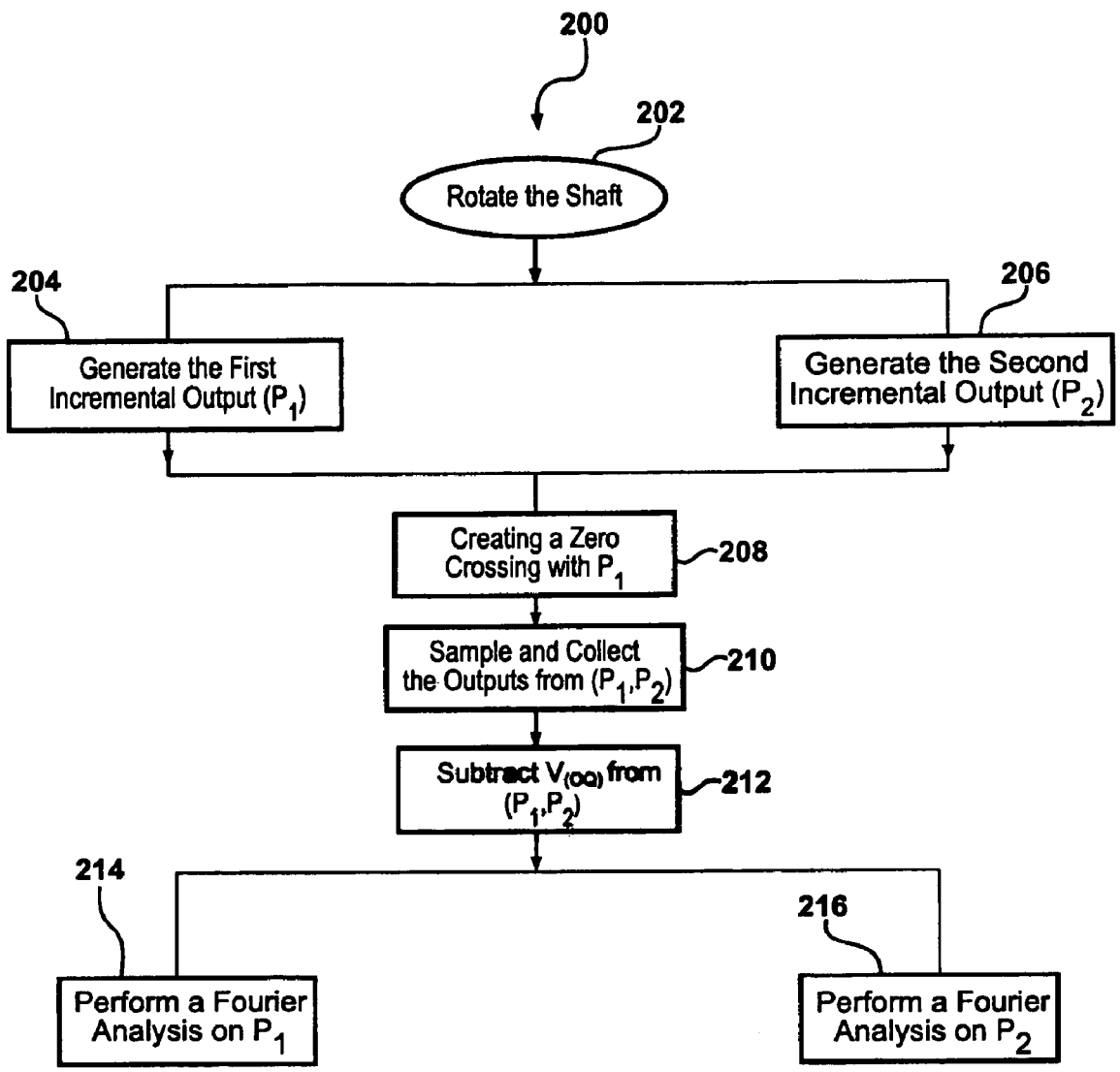
FIG. 29 is a high level flow diagram of the calibration of the incremental outputs of $P_1$ and $P_2$.

Referring to FIG. 29, a method for calibrating the incremental outputs $P_1$ and $P_2$ is generally shown at 200. In step 202, the calibration process requires that the shaft 18 is rotated. In step 204, the first incremental magneto-sensitive element 134 outputs $P_1$ in response to detecting the changing magnetic flux of the ring magnet 82. In step 206, the second incremental magneto-sensitive element 136 outputs $P_2$ in response to detecting the changing magnetic flux of the ring magnet 82. In step 208, a zero crossing is created for the $P_1$ output in response to rotating the shaft 18.

In step 210, the calibration method samples and collects the incremental outputs $P_1$ and $P_2$ from zero to three hundred and sixty degrees. In step 212, the voltage offset ($V_{OQ}$) is subtracted from the collected incremental outputs $P_1$ and $P_2$ as produced by the incremental magneto-sensitive elements 134, 136. In step 214, a Fourier analysis is performed on $P_1$ to produce a first incremental dc component $DC\_P_1$, a plurality of first incremental harmonic outputs, and a first incremental fundamental output. It should be noted that the first incremental dc component $DC\_P_1$ corresponds to a harmonic order of zero after performing the Fourier analysis. The plurality of first incremental harmonic outputs include a plurality first incremental harmonic amplitudes $AN\_P_1$ and a plurality of first incremental harmonic phase angles $PhN\_P_1$, where N is the order or the number of harmonics generated by the Fourier analysis. In the illustrated embodiment, the desired waveform is the first incremental fundamental output which corresponds to the first order harmonic (N=1) after performing the Fourier analysis. The remaining plurality of first incremental harmonic outputs corresponds to errors generally present in $P_1$ and are defined as first incremental errors. It should be noted that additional or different harmonic outputs may be selected as the desired waveform or the waveform that represents errors in $P_1$ and the selection of the harmonic outputs which comprise errors or are selected as the desired waveform are not limited by the illustrated embodiment. The first incremental fundamental output includes a first incremental fundamental amplitude $A1\_P_1$ and a first incremental fundamental phase angle $Ph1\_P_1$. Accordingly, $DC\_P_1$, $AN\_P_1$, $PhN\_P_1$, $A1\_P_1$, and $Ph1\_P_1$ are defined as the first incremental calibration parameters.

In step 216, the Fourier analysis is also performed on $P_2$ to produce a second incremental dc component $DC\_P_2$, a plurality of second incremental harmonic outputs, and a second incremental fundamental output. The second incremental dc component $DC\_P_2$ corresponds to a harmonic order of zero after performing the Fourier analysis. The plurality of second incremental harmonic outputs include a plurality of second incremental harmonic amplitudes $AN\_P_2$ and a plurality of second incremental harmonic phase angle $PhN\_P_2$, where N is an integer and is the order or the number of harmonics generated by the Fourier analysis. The desired waveform is the second incremental fundamental output which corresponds to the first order harmonic after performing the Fourier analysis. The remaining plurality of second incremental harmonic outputs corresponds to the errors generally present in $P_2$ and are defined as first incremental errors. It should be noted that additional or different harmonic outputs may be selected as the desired waveform or the waveform that represents errors in $P_2$ and the selection of those harmonic outputs are not limited by the illustrated embodiment. The second incremental fundamental output includes a second incremental fundamental amplitude $A1\_P_2$ and a second incremental fundamental phase angle $Ph1\_P_2$. Accordingly, $DC\_P_2$, $AN\_P_2$, $PhN\_P_2$, $A1\_P_2$, and $Ph1\_P_2$ are defined as the second incremental calibration parameters.

Figure 30:
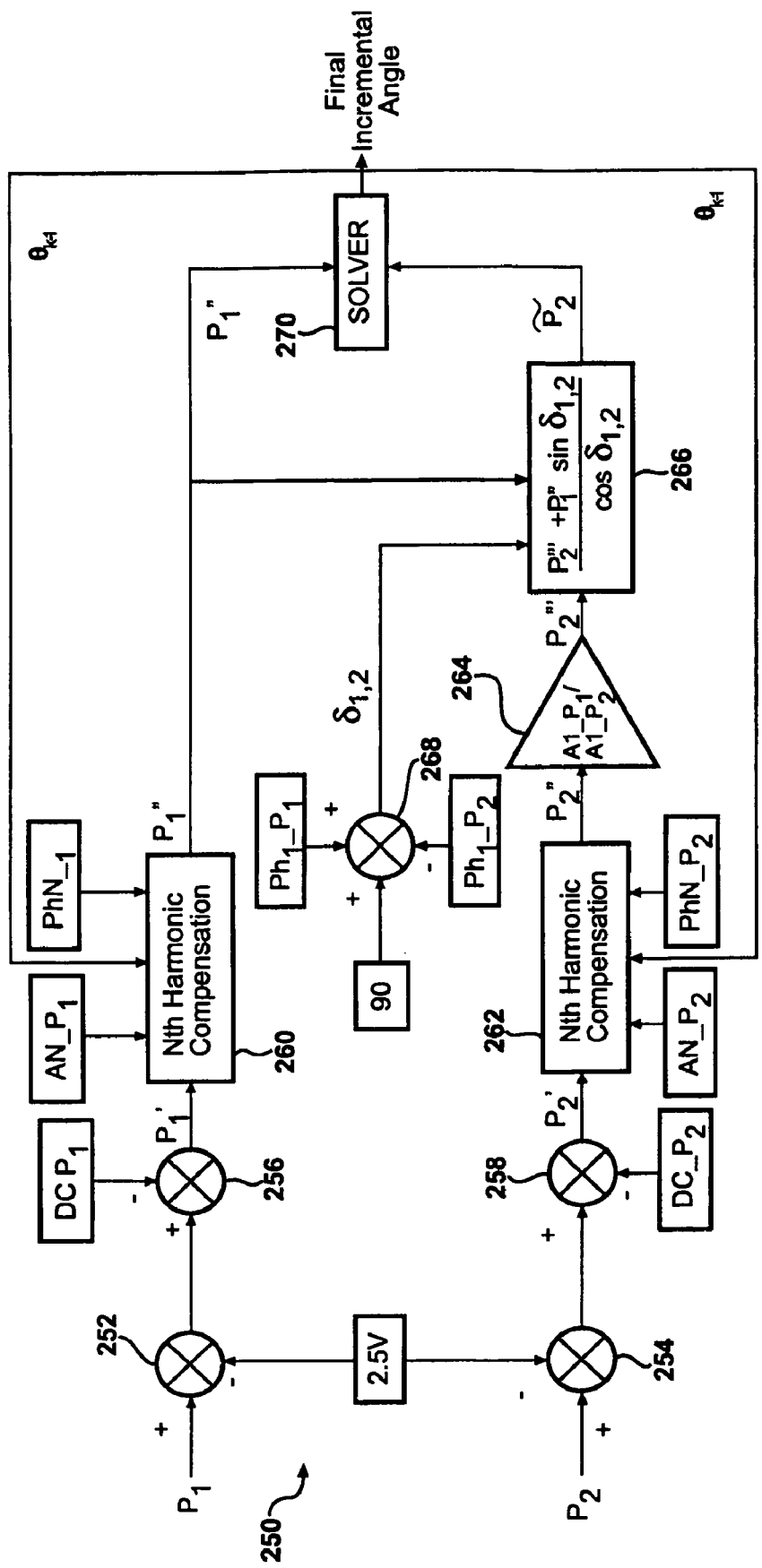
FIG. 30 is a detailed block diagram illustrating the calibration method of the incremental outputs of $P_1$ and $P_2$.

Referring to FIG. 30, a block diagram for the method of compensating the incremental outputs $P_1$ and $P_2$ is generally shown at 250. In the illustrated embodiment, it is necessary to use instantaneous values for the first and the second incremental outputs. These values change for every angle of rotation of the shaft 18. The compensation process produces a first incremental final output and a second incremental final output for every angle of rotation of the shaft.

A first incremental adder 252 and a second incremental adder 254 is used to eliminate the voltage offset ($V_{OQ}$) as generated from the incremental magneto-sensitive elements 134,136. A third incremental adder 256 subtracts $DC\_P_1$ from the $P_1$ to create a first incremental adjusted output $P'_1$. Likewise, a fourth incremental adder 258 subtracts $DC\_P_2$ from $P_2$ to create a second incremental adjusted output $P'_2$.

After producing $P'_1$, a previous position of the shaft (prevpos), $AN\_P_1$, and $PhN\_P_1$ are inserted into a first incremental compensation block 260 wherein a first incremental compensation equation eliminates the first incremental harmonic outputs. This in effect eliminates most of the non-idealities in the $P_1$ output and produces the first incremental final output $P''_1$. The first incremental compensation equation is defined as:

$$P''_1 = P'_1 - AN\_P_1 * \sin[(\text{prevpos} + PhN\_P_1 * N)] \qquad (q)$$

It should be noted that if the previous position (prevpos) of the shaft was not known, an initialization routine will produce the (prevpos) value of the shaft. The first incremental final output $P''_1$ is the compensated value for $P_1$.

After producing $P'_2$ from the fourth incremental adder 258, the previous position of the shaft (prevpos), $AN\_P_2$, and $PhN\_P_2$ are inserted into a second incremental compensation block 262 wherein a second incremental compensation equation eliminates the second incremental harmonic outputs. This in effect eliminates most of the non-idealities in the $P_2$ output and produces a second incremental corrected output $P''_2$. The second incremental compensation equation is defined as:

$$P''_2 = P'_2 - AN\_P_2 * \sin[(\text{prevpos} + PhN\_P_2 * N)] \qquad (r)$$

The output of the incremental compensation equation converges on a single value to produce the second incremental corrected output $P''_2$.

After generating $P''_2$, $P''_2$ is multiplied to a first gain block 264 wherein the gain block includes an incremental gain factor which is defined by the ratio of fundamental amplitudes:

$$A1\_P_1 / A1\_P_2 \qquad (s)$$

By multiplying $P''_2$ with the incremental gain factor, this produces a second incremental normalized output $P'''_2$. This step is performed such that the amplitudes of $P_1$ and $P_2$ are equal.

By establishing a common amplitude between $P_1$ and $P_2$, the next step is to calculate the incremental quadrature error angle $\delta_{1,2}$ between the outputs $P_1$ and $P_2$, ideally a ninety degrees phase shift is required between the outputs $P_1$ and $P_2$. To calculate $\delta_{1,2}$, a fifth incremental adder 268 adds ninety degrees to $Ph1\_P_1$, and $Ph1\_P_2$ is subtracted from the sum of ninety degrees and $Ph1\_P_1$ to calculate the incremental quadrature error angle $\delta_{1,2}$. After solving for $\delta_{1,2}$, an incremental correction block 266 produces a second incremental final output $\tilde{P}_2$. The incremental correction block 266 includes an incremental correction equation and is defined by the following equation:

$$\tilde{P}_2 = [(P'''_2 + P''_1 \sin \delta_{1,2}) / \cos \delta_{1,2}] \qquad (t)$$

Accordingly, the final incremental output $\tilde{P}_2$ is the compensated value for $P_2$.

Figure 28:
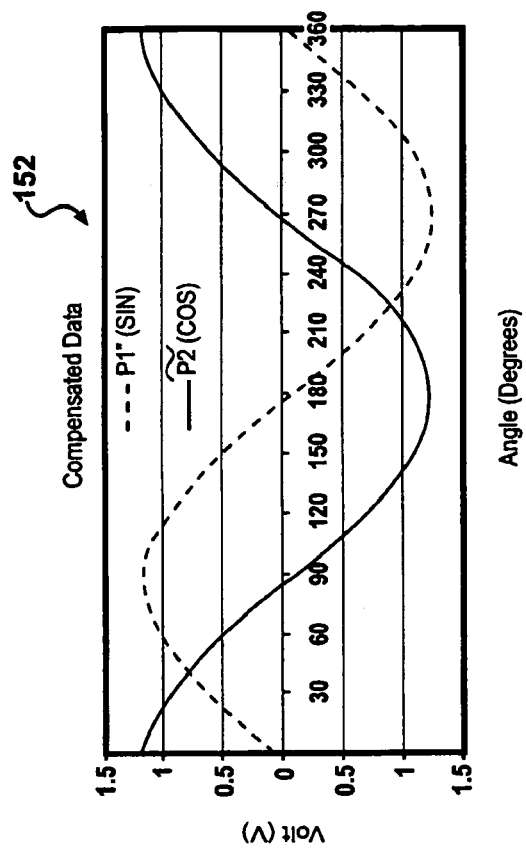
FIG. 28 is a graph of the incremental outputs of $P_1$ and $P_2$ after performing the calibration method.

By employing the method as described above, the objective of providing a common amplitude between the incremental outputs $P_1$ and $P_2$ and achieving a phase shift of substantially ninety degrees between the angles of the incremental outputs $P_1$ and $P_2$ is satisfied. As shown in FIG. 28, the compensated incremental waveforms 152 of the final incremental outputs $P''_1$ and $\tilde{P}_2$ illustrates that the amplitudes are similar and the resulting phase shift between the compensated waveforms 152 are substantially ninety degrees. The first final incremental output $P''_1$ and the second final incremental output $\tilde{P}_2$ generated for each angle of rotation of the shaft 18 is stored on a controller.

It is now possible to employ the solver equation to produce the final incremental angle of the shaft 18. As stated above, the final incremental angle is any angle between 0 and 360 degrees. Referring to FIG. 30, the first and the second incremental final outputs are inserted into a solver equation block 270 where the solver equation provides the final incremental angle of the shaft 18. The solver equation (n) from above is re-written as:

$$\varphi_{new} = \varphi_{old} - \left( \frac{P_1'' \cos\varphi - \tilde{P}_2 \sin\varphi}{-P_1'' \sin\varphi - \tilde{P}_2 \cos\varphi} \right) \quad (u)$$

The variable $\varphi_{new}$ will converge on a value of between 0 and 360 degrees and is defined as the final incremental angle. As stated above, the converged angle $\varphi_{new}$ is assigned to the final incremental angle.

Figure 31:
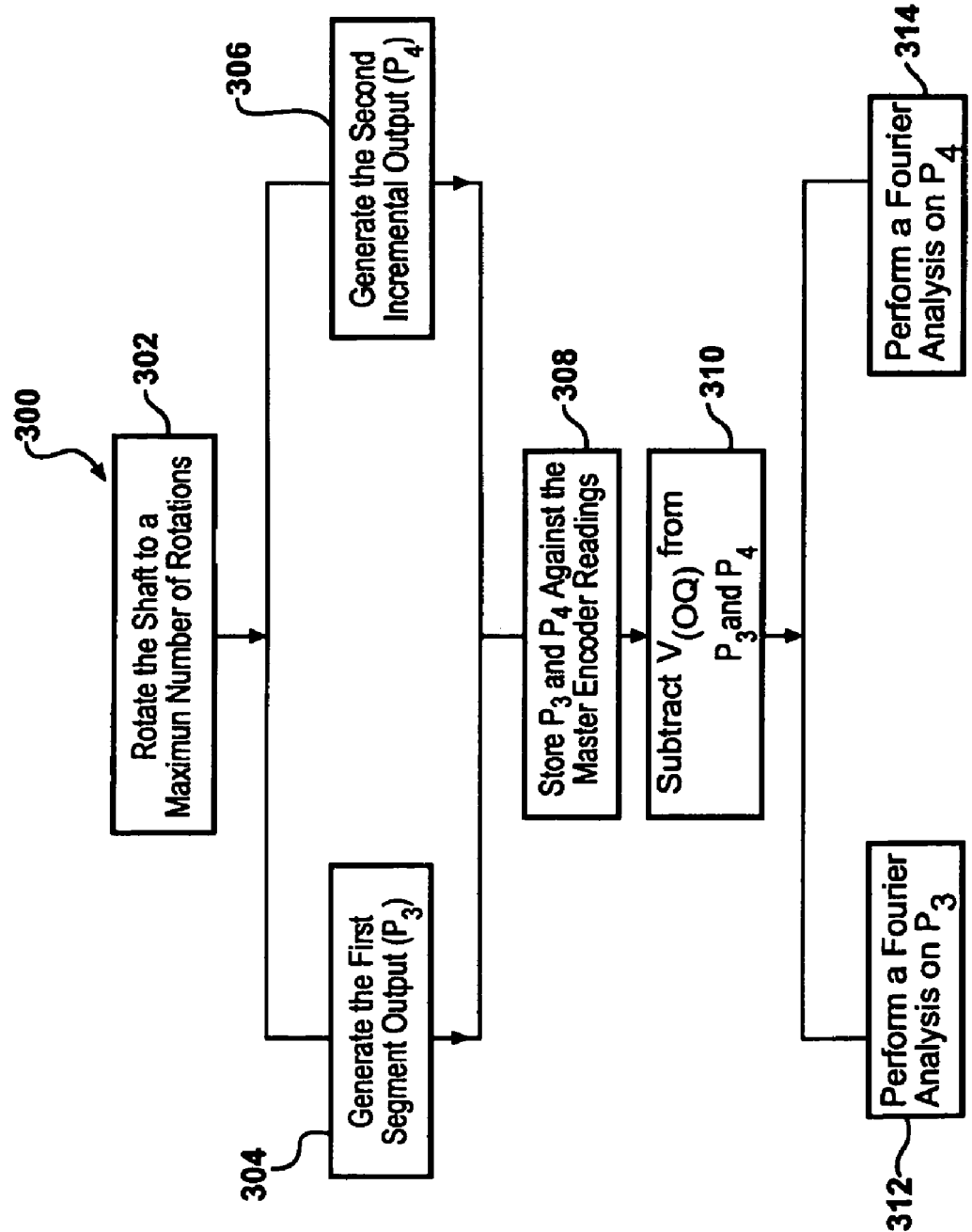
FIG. 31 is a high level flow diagram of the calibration of the segment outputs of $P_3$ and $P_4$.

Referring to FIG. 31, a method for calibrating the segment outputs $P_3$ and $P_4$ is, generally shown at 300. In step 302, the calibration process requires that the shaft 18 is rotated to a maximum number of rotations or a total of eighteen hundred degrees. In step 304, the first segment magneto-sensitive element 138 outputs $P_3$ in response to detecting the changing magnetic flux of the segment magnet 106. In step 306, the second segment magneto-sensitive element 140 outputs $P_4$ in response to detecting the changing magnetic flux of the segment magnet 106. In step 308, a controller stores $P_3$ and $P_4$ against a plurality of master encoder readings.

In step 310, the voltage offset ($V_{OQ}$) is subtracted from the segment outputs $P_3$ and $P_4$ as produced by the segment magneto-sensitive elements 138, 140. In step 312, a Fourier analysis is performed on $P_3$ to produce a first segment dc component $DC\_P_3$ and a first segment fundamental output. It should be noted that the first segment dc component $DC\_P_3$ corresponds to a harmonic order of zero after performing the Fourier analysis. The first segment fundamental output includes a first segment fundamental amplitude $A1\_P_3$ and a first segment fundamental phase angle $Ph1\_P_3$. Accordingly, $DC\_P_3$, $A1\_P_3$, and $Ph1\_P_3$ are defined as the first segment calibration parameters.

In step 314, the Fourier analysis is also performed on $P_4$ to produce a second segment dc component $DC\_P_4$ and a second segment fundamental output. The second segment dc component $DC\_P_4$ corresponds to harmonic order of zero after performing the Fourier analysis. The second segment fundamental output includes a second segment fundamental amplitude $A1\_P_4$ and a second segment fundamental phase angle $Ph1\_P_4$. Accordingly, $DC\_P_4$, $A1\_P_4$, and $Ph1\_P_4$ are defined as the second segment calibration parameters.

Figure 32:
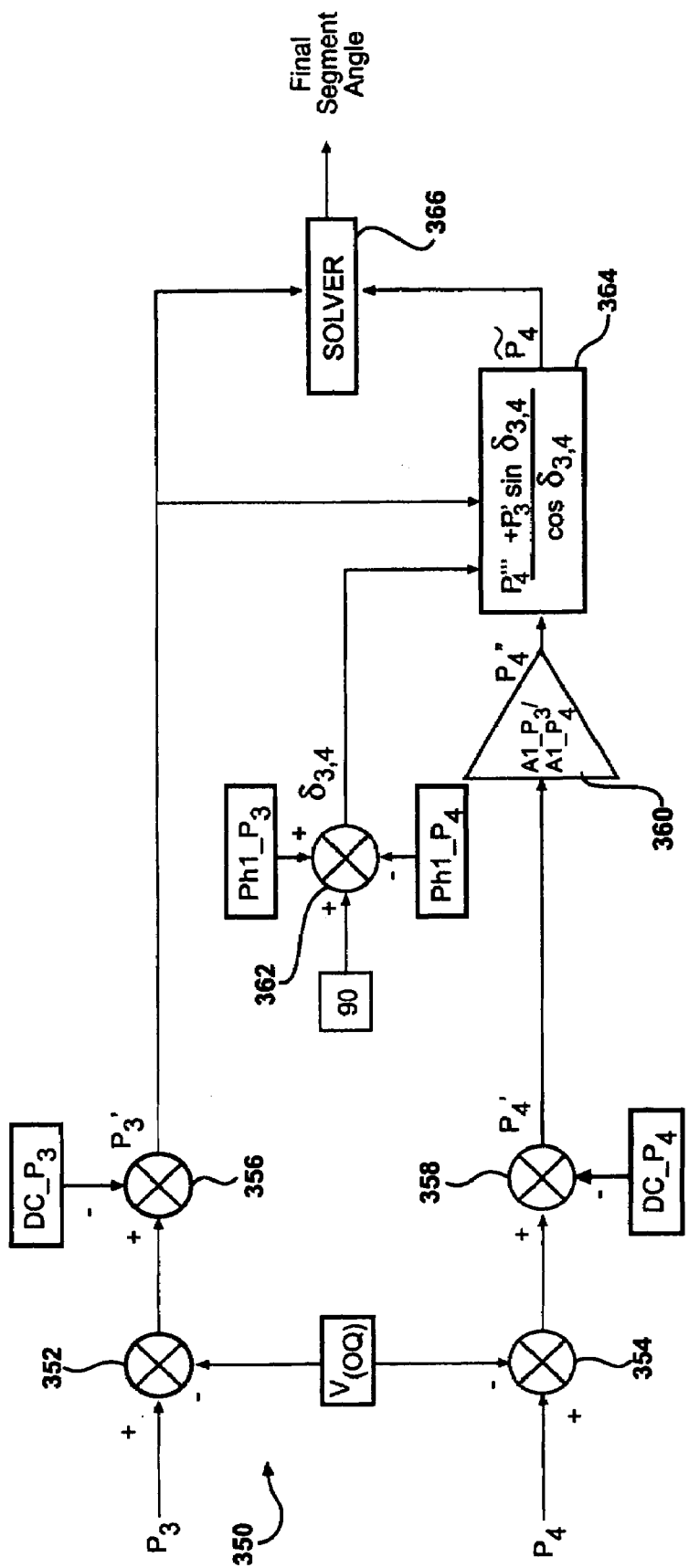
FIG. 32 is a detailed block diagram illustrating the calibration method of the segment outputs of $P_3$ and $P_4$.

Referring to FIG. 32, a block diagram for the method of compensating the segment outputs $P_3$ and $P_4$ is generally shown at 350. In the illustrated embodiment, it is necessary to use instantaneous values for the first and the second segment outputs. The value changes for every angle of rotation of the change gear 100. The compensation process produces a first segment final output and a second segment final output for every angle of rotation of the shaft, and each first segment final output and second segment final output is stored in a controller.

A first segment adder 352 and a second segment adder 354 are used to eliminate the voltage offset ($V_{OQ}$) generated from the segment magneto-sensitive elements 138,140 and the adders 352, 354. A third segment adder 356 subtracts $DC\_P_3$ from the $P_3$ output to create a first segment final output $P'_3$. Accordingly, $P'_3$ is the compensated value for $P_3$. Likewise, a fourth segment adder 358 subtracts $DC\_P_4$ from the $P_4$ output to create a second segment adjusted output $P'_4$.

After generating $P'_4$, $P'_4$ is multiplied to a segment gain block 360 wherein the gain block includes a segment gain factor which is defined by the ratio of fundamental amplitudes:

$$A1\_P_3/A1\_P_4 \quad (v)$$

By multiplying $P'_4$ with the segment gain factor, this produces a second incremental normalized output $P''_4$. This step is performed such that the amplitudes of $P_3$ and $P_4$ are equal.

By establishing a common amplitude between $P_3$ and $P_4$, the next step is to calculate the segment quadrature error angle $\delta_{3,4}$ between the outputs $P_3$ and $P_4$, ideally a ninety degrees phase shift is required. To calculate $\delta_{3,4}$, a fifth incremental adder 362 adds ninety degrees to $Ph1\_P_3$, and $Ph1\_P_4$ is subtracted from the sum of ninety degrees and $Ph1\_P_3$, to calculate $\delta_{3,4}$. After solving for $\delta_{3,4}$, a segment correction block 364 produces a second segment final output $\tilde{P}_4$. The segment correction block 364 includes a segment correction equation and is defined by the following equation:

$$\tilde{P}_4 = [(P''_4 + P'_3 \sin \delta_{3,4})/\cos \delta_{3,4}] \quad (w)$$

Accordingly, the second segment final output $\tilde{P}_4$ is the compensated value for $P_4$.

Figure 34:
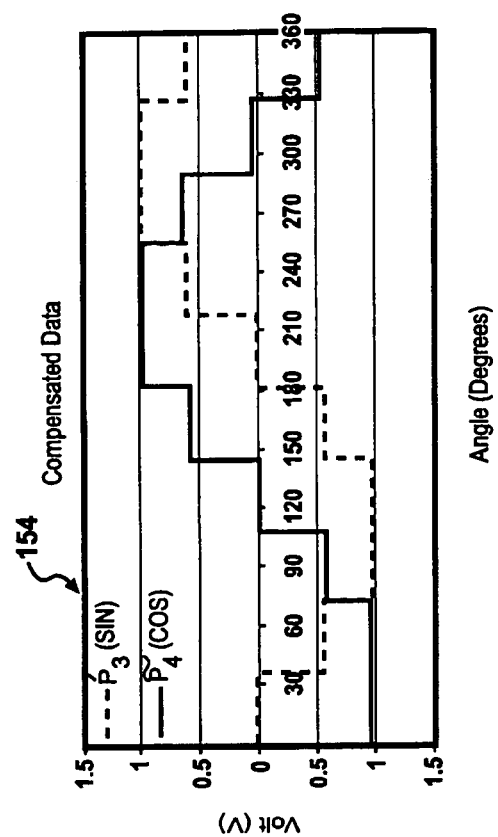
FIG. 34 is a graph of the segment outputs of $P_3$ and $P_4$ after performing the calibration method.

By employing the method as described above, the objective of providing a common amplitude between the segment outputs $P_3$ and $P_4$ and achieving a phase shift of substantially ninety degrees between the angles of the segment outputs $P_3$ and $P_4$ is satisfied. As shown in FIG. 34, the compensated segment waveforms 154 of the final segment outputs $P'_3$ and $\tilde{P}_4$ illustrates that the amplitudes are similar and the resulting phase shift between the compensated waveforms 154 are substantially ninety degrees. The first segment final output $P'_3$ and the second segment final output $\tilde{P}_4$ generated for each angle of rotation of the shaft 18 is stored on a controller.

It is now possible to employ the solver equation to produce the final segment angle of the shaft 18. The first and the second segment final outputs are inserted into a solver equation block 366 where the solver equation provides the final segment angle of the shaft 18. The solver equation (n) from above is re-written as:

$$\varphi_{new} = \varphi_{old} - \left( \frac{P'_3 \cos\varphi - \tilde{P}_4 \sin\varphi}{-P'_3 \sin\varphi - \tilde{P}_4 \cos\varphi} \right) \quad (x)$$

The variable $\varphi_{new}$ will converge to the actual segment angle which is a value between 0 and 360 degrees.

After calculating the final incremental angle and the actual segment angle, the actual segment angle is compared to the final segment angle and corresponding integer (n) as listed in Table 1 above. In response to comparing the actual segment angle to the final segment angle, the final position equation associated with the final segment angle takes the final incremental angle as calculated from equation (u) and inserts the final incremental angle and the corresponding integer (n) into the final angle position equation (p) to produce the final angle position of the shaft 18 which may be any angle between +/−900 degrees.

Obviously, many modifications and variations of the present invention are possible in light of the above teachings. The invention may be practiced otherwise than as specifically described within the scope of the appended claims.

What is claimed is:

1. An integrated sensor for measuring the relative rotational movement between an input shaft and an output shaft and for measuring the angular position of said shafts, said integrated sensor comprising:
   an input shaft;
   an output shaft axially aligned with said input shaft for rotation about an axis;
   a support housing for rotatably supporting said output shaft for rotation about said axis;
   a torsion bar interconnecting said shafts for allowing relative rotational movement between said shafts in response to a predetermined torque;
   a wheel supported by said output shaft for rotation with said output shaft;
   a torque sensing mechanism disposed about said shafts for measuring relative rotational movement between said input shaft and said output shaft;
   an incremental sensing mechanism responsive to the rotation of said wheel for generating a incremental output indicative of the incremental angular position of said wheel;
   a segment sensing mechanism for providing a segment output indicative of the angular segment in which said wheel is disposed; and
   a sensor casing supported by said housing and supporting at least portions of said sensing mechanisms.

2. An integrated sensor as set forth in claim 1 wherein said torque sensing mechanism includes a torque rotor assembly coupled with said input shaft for rotation therewith.

3. An integrated sensor as set forth in claim 2 wherein said torque rotor assembly includes a plurality of magnets for providing a magnetic flux in response to the relative rotational movement between said shafts.

4. An integrated sensor as set forth in claim 3 including a pair of torque stators supported by said wheel in axially spaced planes along said axis to define a gap therebetween and surrounding said plurality of magnets.

5. An integrated sensor as set forth in claim 4 including a circuit board having a torque leg for supporting said portion of torque sensing mechanism and a position leg axially spaced from said torque leg for supporting said portion of incremental sensing mechanism and said segment sensing mechanism.

6. An integrated sensor as set forth in claim 5 wherein said portion of torque sensing mechanism includes at least one torque magneto-sensitive element supported by said torque leg and disposed in said gap for measuring relative rotational movement between said shafts.

7. An integrated sensor as set forth in claim 6 wherein said incremental sensing mechanism includes a ring magnet axially spaced from said torque stators and coupled with said wheel for rotation therewith.

8. An integrated sensor as set forth in claim 7 wherein said portion of incremental sensing mechanism includes a at least one incremental magneto-sensitive elements supported by said position leg to coact with said ring magnet.

9. An integrated sensor as set forth in claim 8 wherein said position leg includes a pair of circumferentially extending arms disposed about said wheel and said incremental magneto-sensitive elements being circumferentially spaced from each other on said arms.

10. An integrated sensor as set forth in claim 9 wherein said segment sensing mechanism includes a change gear rotatably supported by said sensor casing.

11. An integrated sensor as set forth in claim 10 wherein said segment sensing mechanism includes a segment magnet and coupled to said change gear for rotation therewith and at least one segment magneto-sensitive element supported by said position leg.

12. An integrated sensor as set forth in claim 11 wherein said torque rotor assembly includes a back iron non-rotatably coupled with said input shaft and having a plurality of pockets for supporting said magnets and a retaining ring surrounding said back iron.

13. An integrated sensor as set forth in claim 12 wherein said change gear includes a first plurality of change teeth disposed in a first plane and a second plurality of teeth disposed in a second plane spaced axially from said first plane with said first plurality of change teeth and said second plurality of change teeth being angularly offset and out of phase with each other.

14. An integrated sensor as set forth in claim 13 including a first blocking cam disposed in said first plane and extending circumferentially between ends about said wheel one hundred and eighty degrees and a second blocking cam disposed in said second plane and extending circumferentially between said ends about said wheel through the remaining one hundred and eighty degrees.

15. An integrated sensor as set forth in claim 14 wherein said ends of blocking cams defining a first drive tooth in said first plane for meshing engagement with said first plurality of change teeth and a second drive tooth in said second plane for meshing engagement with said second plurality of change teeth.

16. An integrated sensor as set forth in claim 15 wherein said first plurality of change teeth and said second plurality of change teeth includes an engagement surface extending between each of said change teeth for each of said first plurality of change teeth and said second plurality of change teeth and engaging one of said first blocking cam and said second blocking cam.

17. An integrated torque and position sensor, said sensor comprising:
   a support housing;
   an output shaft rotatably supported by said housing for rotation about an axis;
   an input shaft axially aligned with said output shaft;
   a torsion bar interconnecting said shafts for transmitting rotational forces between said shafts while allowing relative rotational movement between said shafts in response to a predetermined torque;
   a wheel surrounding and supported by said output shaft for rotation therewith;
   a torque rotor assembly disposed about said input shaft and rotated with said input shaft;
   said torque rotor assembly including a back iron having a plurality of pockets spaced about the periphery;
   said torque rotor assembly including a magnet disposed in each of said pockets;
   said torque rotor assembly including a retaining ring disposed about and rotatable with said back iron for retaining said magnets in said pockets;
   a pair of torque stators spaced axially along said axis to define a gap and surrounding said torque rotor assembly;
   a sensor casing having a pair of casing arms supported by said support housing;

a circuit board supported by said sensor casing and including a torque leg extending into said gap between said torque stators and a position leg having a pair of extending arms supported by said casing arms;

at least one torque magneto-sensitive element disposed on said torque leg for sensing said relative rotational movement between said shafts by sensing the magnetic flux in said gap;

a change gear rotatably supported by said sensor casing and including a first plurality of change teeth disposed in a first plane and a second plurality of change teeth disposed in a second plane spaced axially from said first plane with said first and second plurality of change teeth being angularly offset and out of phase with each other;

a coupling ring coupled to said wheel for securing said wheel to said output shaft;

a first blocking cam disposed in said first plane and extending circumferentially between ends about said wheel one hundred and eighty degrees and a second blocking cam disposed in said second plane and extending between said ends circumferentially about said wheel through the remaining one hundred and eighty degrees;

said ends of said blocking cams defining a first drive tooth in said first plane for meshing engagement with said first plurality of change teeth on said change gear and a second drive tooth in said second plane for meshing engagement with said second plurality of change teeth on said change gear;

an engagement surface extending between each of said change teeth for engaging one of said first and second blocking cams;

a segment magnet and coupled to said change gear for rotation therewith and for providing a magnetic flux indicative of the angular segment in which said change gear is disposed;

at least one segment magneto-sensitive element disposed on said position leg of said circuit board for detecting the magnetic flux of said segment magnet and for outputting a segment output indicative of the angular segment in which the change gear is disposed;

a ring magnet disposed about said wheel for rotation therewith and for providing a magnetic flux indicative of the incremental angular rotation of said wheel; and at least one incremental magneto-sensitive element supported on said extending arms of said position leg of said circuit board for detecting the magnetic flux of said ring magnet and for outputting an incremental output indicative of the angular rotation of said shaft.

18. An integrated sensor for measuring the relative rotational movement between an input shaft and an output shaft and for measuring the angular position of said shafts, said integrated sensor comprising:

an input shaft;

an output shaft axially aligned with said input shaft for rotation about an axis;

a support housing for rotatably supporting said output shaft for rotation about said axis;

a torsion bar interconnecting said shafts for allowing relative rotational movement between said shafts in response to a predetermined torque.

a wheel supported by said output shaft for rotation with said output shaft;

a torque sensing mechanism disposed about said shafts for measuring relative rotational movement between said input shaft and said output shaft;

an incremental sensing mechanism responsive to the rotation of said wheel for generating a incremental output indicative of the incremental angular position of said wheel; and a sensor casing supported by said housing and supporting at least portions of said sensing mechanisms.

19. An integrated sensor as set forth in claim 18 wherein said torque sensing mechanism includes a torque rotor assembly coupled with said input shaft for rotation therewith.

20. An integrated sensor as set forth in claim 19 wherein said torque rotor assembly includes a plurality of magnets for providing a magnetic flux in response to the relative rotational movement between said shafts.

21. An integrated sensor as set forth in claim 20 wherein said torque sensing mechanism includes a plurality of magnets disposed about and supported for rotation with said input shaft.

22. An integrated sensor as set forth in claim 21 including a pair of torque stators supported by said wheel in axially spaced planes along said axis to define a gap therebetween and surrounding said plurality of magnets.

23. An integrated sensor as set forth in claim 22 including a circuit board having a torque leg for supporting said portion of torque sensing mechanism and a position leg axially spaced from said torque leg for supporting said portion of incremental sensing mechanism.

24. An integrated sensor as set forth in claim 23 wherein said portion of torque sensing mechanism includes at least one torque magneto-sensitive element supported by said torque leg and disposed in said gap for measuring relative rotational movement between said shafts.

25. An integrated sensor as set forth in claim 24 wherein said incremental sensing mechanism includes a ring magnet axially spaced from said torque stators and coupled with said wheel for rotation therewith.

26. An integrated sensor as set forth in claim 25 wherein said portion of incremental sensing mechanism includes a plurality of incremental magneto-sensitive elements supported by said position leg to coact with said ring magnet.

27. An integrated sensor as set forth in claim 26 wherein said position leg includes a pair of circumferentially extending arms disposed about said wheel and said incremental magneto-sensitive elements being circumferentially spaced from each other on said arms.

28. An integrated sensor as set forth in claim 27 wherein said torque rotor assembly includes a back iron non-rotatably coupled with said input shaft and having a plurality of pockets for supporting said magnets and a retaining ring surrounding said back iron.

29. An integrated torque and position sensor, said sensor comprising:

a support housing;

an output shaft rotatably supported by said housing for rotation about an axis;

an input shaft axially aligned with said output shaft;

a torsion bar interconnecting said shafts for transmitting rotational forces between said shafts while allowing relative rotational movement between said shafts in response to a predetermined torque;

a wheel surrounding and supported by said output shaft for rotation therewith;

a torque rotor assembly disposed about said input shaft and rotated with said input shaft;

said torque rotor assembly including a back iron having a plurality of pockets spaced about the periphery;

said torque rotor assembly including a magnet disposed in each of said pockets;

said torque rotor assembly including a retaining ring disposed about and rotatable with said back iron for retaining said magnets in said pockets;

a pair of torque stators spaced axially along said axis to define a gap and surrounding said torque rotor assembly;

a sensor casing having a pair of casing arms supported by said support housing;

a circuit board supported by said sensor casing and including a torque leg extending into said gap between said torque stators and a position leg having a pair of extending arms supported by said casing arms;

at least one torque magneto-sensitive element disposed on said torque leg for sensing said relative rotational movement between said shafts by sensing the magnetic flux in said gap;

a coupling ring coupled to said wheel for providing securing said wheel to said output shaft;

a ring magnet disposed about said wheel for rotation therewith and for providing a magnetic flux indicative of the incremental angular rotation of said wheel; and at least one incremental magneto-sensitive element supported on said extending arms of said position leg of said circuit board for detecting the magnetic flux of said ring magnet and for outputting an incremental output indicative of the angular rotation of said shaft.

* * * * *